US012411390B2

(12) United States Patent
Ogawa et al.

(10) Patent No.: US 12,411,390 B2
(45) Date of Patent: Sep. 9, 2025

(54) IMAGING APPARATUS AND LENS APPARATUS INCLUDING LENS SECTIONS WITH DIFFERENT ANGLES OF VIEW

(71) Applicant: Sony Group Corporation, Tokyo (JP)

(72) Inventors: Tetsu Ogawa, Tokyo (JP); Takumi Tsuji, Chiba (JP); Takashi Okazaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 18/035,219

(22) PCT Filed: Nov. 4, 2021

(86) PCT No.: PCT/JP2021/040639
§ 371 (c)(1),
(2) Date: May 3, 2023

(87) PCT Pub. No.: WO2022/102515
PCT Pub. Date: May 19, 2022

(65) Prior Publication Data
US 2023/0408889 A1    Dec. 21, 2023

(30) Foreign Application Priority Data

Nov. 10, 2020    (JP) ................. 2020-187385

(51) Int. Cl.
| | |
|---|---|
| *G03B 11/00* | (2021.01) |
| *H04N 23/75* | (2023.01) |
| *H04N 23/76* | (2023.01) |
| *H04N 23/95* | (2023.01) |

(52) U.S. Cl.
CPC ............. *G03B 11/00* (2013.01); *H04N 23/75* (2023.01); *H04N 23/76* (2023.01); *H04N 23/95* (2023.01)

(58) Field of Classification Search
CPC ........ G03B 11/00; G03B 15/00; G03B 19/07; H04N 23/75; H04N 23/76; H04N 23/95; H04N 23/951; H04N 23/957
See application file for complete search history.

(56) References Cited

U.S. PATENT DOCUMENTS

| | | | | |
|---|---|---|---|---|
| 6,960,817 | B2 * | 11/2005 | Ogura ................... | H04N 25/41 257/292 |
| 7,123,298 | B2 * | 10/2006 | Schroeder ............. | H04N 25/11 358/518 |
| 7,199,348 | B2 * | 4/2007 | Olsen ..................... | H04N 23/16 348/297 |

(Continued)

FOREIGN PATENT DOCUMENTS

| | | |
|---|---|---|
| JP | 3891981 B2 | 3/2007 |
| JP | 2010-064718 A | 3/2010 |

(Continued)

*Primary Examiner* — Hung H Lam
(74) *Attorney, Agent, or Firm* — Paratus Law Group, PLLC

(57) ABSTRACT

An imaging apparatus according to the present technology includes an image sensor, and multiple lens sections each configured to form a subject image in a different area of the image sensor via a different wavelength filter. At least one of the multiple lens sections has an angle of view different from an angle of view of the other lens sections.

15 Claims, 27 Drawing Sheets

(56) References Cited

U.S. PATENT DOCUMENTS

| | | | | |
|---|---|---|---|---|
| 7,417,674 B2* | 8/2008 | Gruhlke | ................. | H04N 23/69 |
| | | | | 348/340 |
| 8,600,227 B2 | 12/2013 | Xu et al. | | |
| 11,832,018 B2* | 11/2023 | Llan | ..................... | H04N 5/2625 |
| 2005/0128335 A1* | 6/2005 | Kolehmainen | ........ | H04N 25/41 |
| | | | | 348/340 |
| 2005/0128509 A1* | 6/2005 | Tokkonen | .............. | H04N 23/84 |
| | | | | 358/448 |
| 2005/0134712 A1* | 6/2005 | Gruhlke | ................. | H04N 23/15 |
| | | | | 348/E9.01 |
| 2006/0127080 A1* | 6/2006 | Mori | .................... | H04N 23/635 |
| | | | | 396/125 |
| 2008/0174670 A1* | 7/2008 | Olsen | .................. | H04N 25/133 |
| | | | | 257/E31.127 |
| 2010/0321532 A1* | 12/2010 | Hashimoto | .......... | H04N 23/741 |
| | | | | 348/E9.053 |
| 2013/0093842 A1* | 4/2013 | Yahata | .................. | H04N 23/69 |
| | | | | 348/E7.001 |
| 2016/0252734 A1* | 9/2016 | Rossi | ................ | G02B 13/0065 |
| | | | | 348/340 |
| 2017/0280045 A1* | 9/2017 | Nonaka | ................ | H04N 23/673 |
| 2021/0333211 A1* | 10/2021 | Chen | ................ | C12N 15/1006 |
| 2022/0004761 A1* | 1/2022 | Biancale | ................ | G01S 13/93 |

FOREIGN PATENT DOCUMENTS

| | | |
|---|---|---|
| JP | 2016-049102 A | 4/2016 |
| JP | 2019-001325 A | 1/2019 |
| WO | WO 2015/068301 A1 | 5/2015 |

\* cited by examiner

FIG. 4
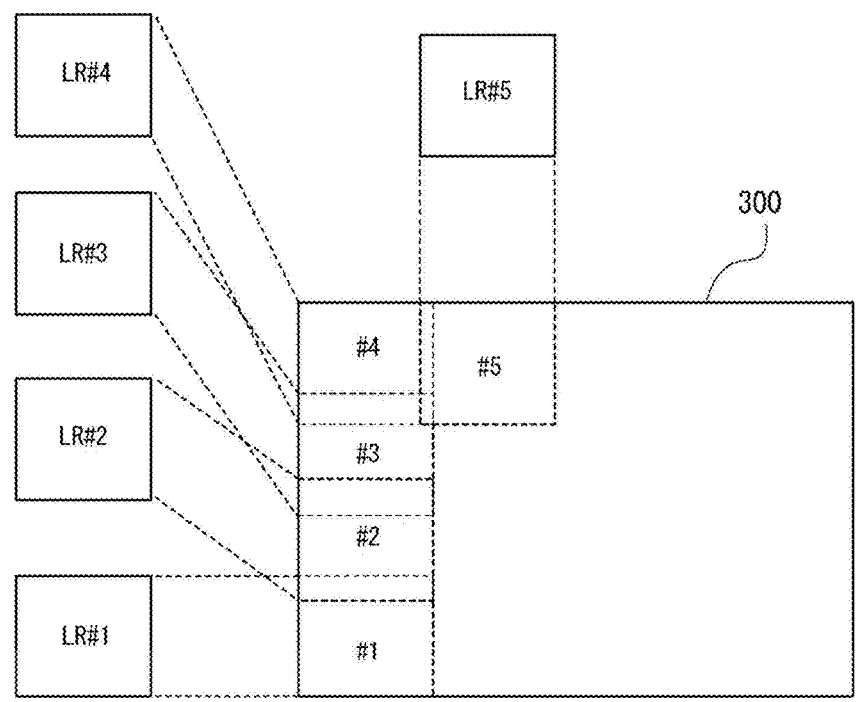
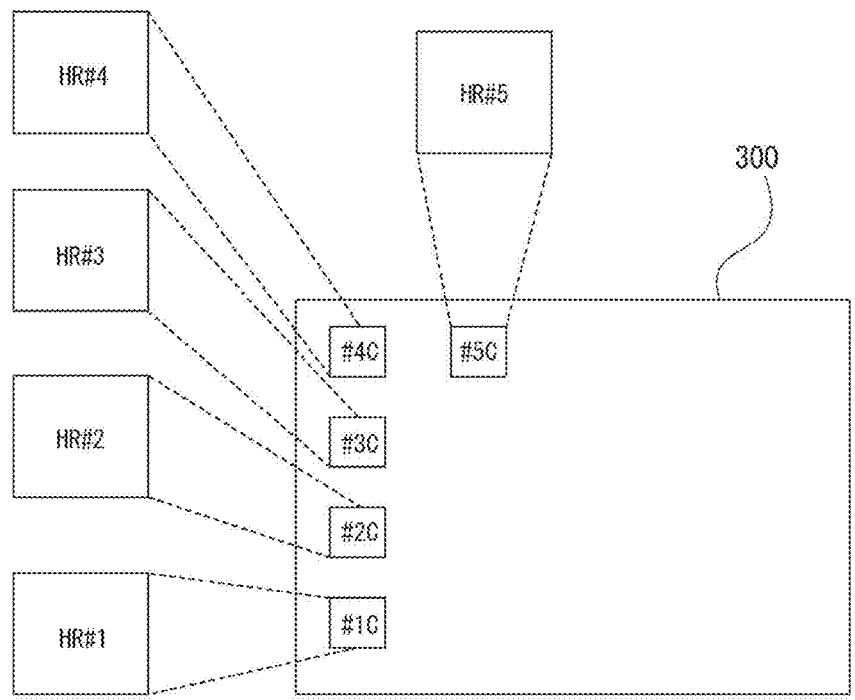

FIG. 5
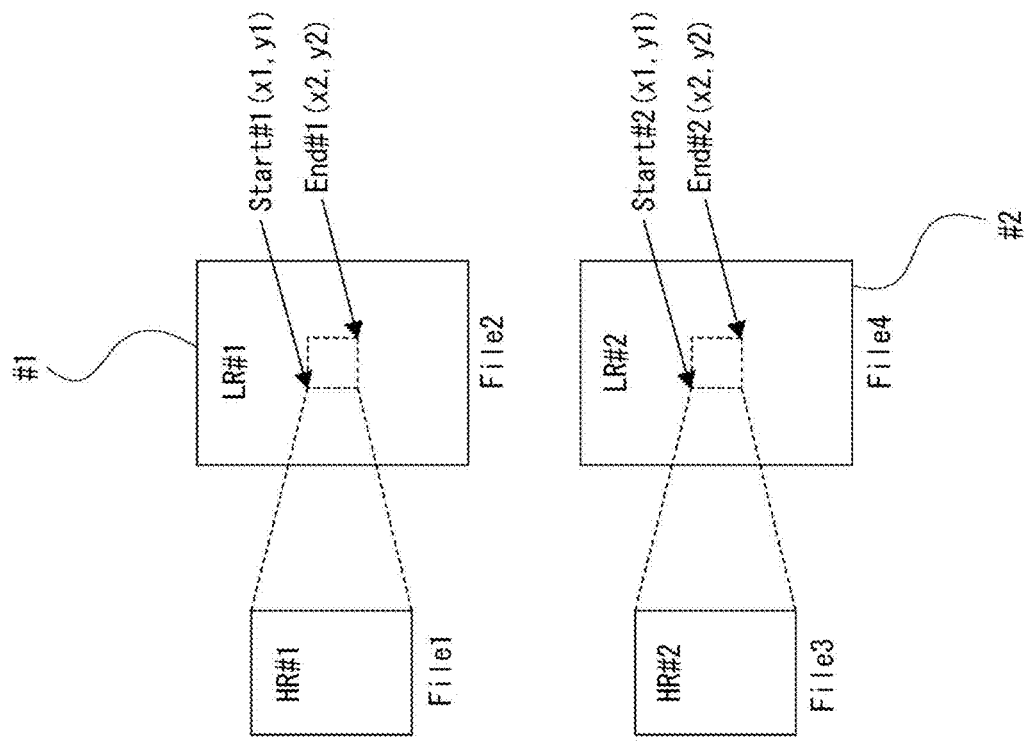
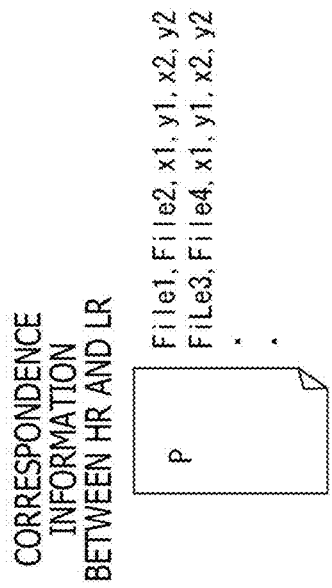

FIG.21
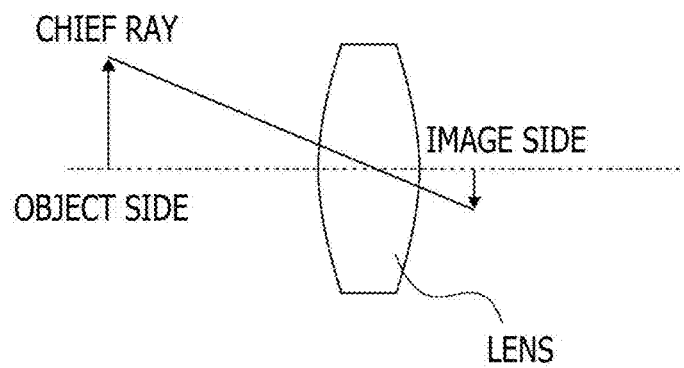
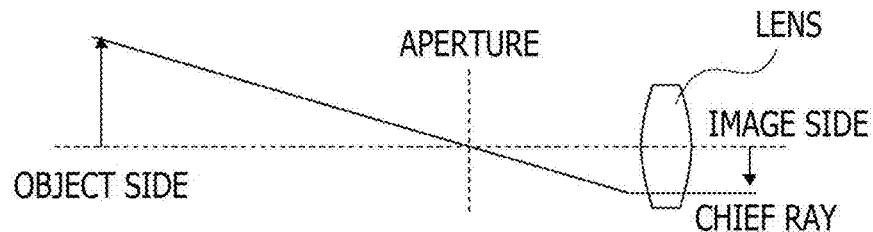
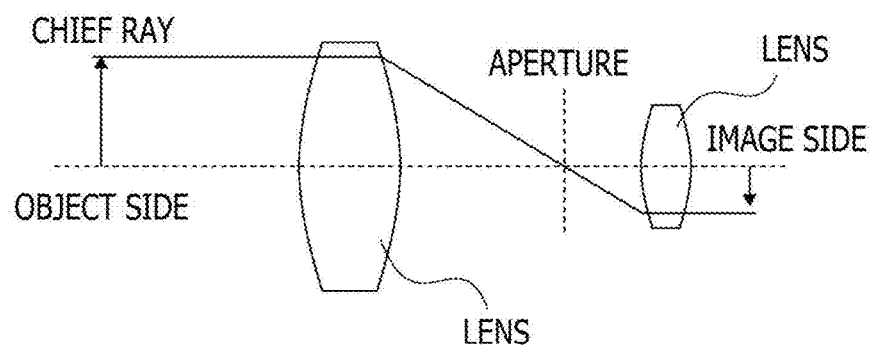

IMAGING APPARATUS AND LENS APPARATUS INCLUDING LENS SECTIONS WITH DIFFERENT ANGLES OF VIEW

CROSS REFERENCE TO PRIOR APPLICATION

This application is a National Stage Patent Application of PCT International Patent Application No. PCT/JP2021/040639 (filed on Nov. 4, 2021) under 35 U.S.C. § 371, which claims priority to Japanese Patent Application No. 2020-187385 (filed on Nov. 10, 2020), which are all hereby incorporated by reference in their entirety.

TECHNICAL FIELD

The present technology relates to an imaging apparatus and a lens apparatus, and in particular to a technical field of a multi-spectrum camera that obtains a spectral image for each wavelength.

BACKGROUND ART

In recent years, sensing that uses a flying body such as a drone has widely been performed. Physical properties, physiological conditions, and the like of a sensing target can be measured using various optical wavelengths and techniques, in addition to measurement of shapes based on images of visible light (RGB).

For such sensing, a multi-spectrum camera has been developed that can simultaneously measure multiple wavelengths, and in large-scale farm fields, remote sensing using a drone, or the like, has been performed to observe conditions of plants. For example, efforts have been made to remotely sense a vegetation state of plants by imaging the vegetation state while moving over a farm field with use of a small flying body equipped with a multi-spectrum camera.

Note that examples of related technologies include PTL 1 listed below. PTL 1 describes the use, in one camera, of two lenses with different telephoto distances for "(wide-angle) imaging of a user, a landscape, and the like" and "(high-resolution) reading for a barcode and the like."

CITATION LIST

Patent Literature

[PTL 1]
Japanese Patent No. 3891981

SUMMARY

Technical Problems

There has been a desire to reduce the size and weight of camera apparatuses (imaging apparatuses) in general in addition to multi-spectrum cameras that obtain a spectral image for each wavelength.

Additionally, in a case where a multi-spectrum camera is used to measure multiple wavelengths, an appropriate image resolution may be desired to be set for each of the wavelengths.

For example, for RGB images intended for visual check of a measurement target, images are acquired by imaging at a relatively wide angle with a small number of flights. On the other hand, for NIR (Near Infra Red) images and the like, which are captured for sensing for numerical information, a narrow angle is used to uniformly measure the measurement target. This is because, for wide angles, the center of an image depicts the target viewed from immediately above, whereas ends of the image may depict a side surface of the target or erroneous appearance of shadows.

Additionally, even when a cover range (sampling measurement ratio) is reduced to identify or separate the measurement target, the resolution may be required to be increased by imaging at a narrow angle.

In view of the above-described circumstances, an object of the present technology is to provide a technology that reduces the size and weight of a multi-spectrum camera for obtaining a spectral image for each wavelength, while enabling the multi-spectrum camera to perform imaging at an appropriate angle of view corresponding to the wavelength.

Solution to Problems

An imaging apparatus according to the present technology includes an image sensor and multiple lens sections each configured to form a subject image in a different area of the image sensor via a different wavelength filter, at least one of the multiple lens sections having an angle of view different from an angle of view of the other lens sections.

As described above, with the configuration including the multiple lens sections each configured to form a subject image in a different area of the image sensor via a different wavelength filter, multiple image sensors need not be provided to obtain a spectral image for each wavelength. Additionally, in this present configuration, at least one of the lens sections has an angle of view different from that of the other lens sections, so that different angles of view can be set according to the wavelength.

Note that the multi-spectrum camera as used herein is a generic term for cameras that can image multiple wavelength bands, and includes cameras referred to as hyper spectrum cameras as well as cameras generally referred to as multi-spectrum cameras.

In the configuration of the imaging apparatus according to the present technology described above, the lens sections may include a first lens section configured to perform image formation via a wavelength filter that separately transmits R, G, and B light for each pixel of the image sensor and a second lens section configured to perform image formation via a wavelength filter that transmits light of a predetermined wavelength band for entire irradiation light traveling to an image formation area of the second lens section on the image sensor, and the first lens section may have a wider angle of view than the second lens section.

An RGB image obtained by the first lens section is suitable for checking the appearance over a wide range and is desired to be a wide-angle image. In contrast, an image entirely including a light receiving signal of light of a predetermined wavelength band, such as an NIR (Near Infra Red) image, suitably has a high resolution for various measurements and is desired to be a narrow-angle image.

In the configuration of the imaging apparatus according to the present technology described above, the lens sections may include lens sections having a relation in which the wavelength filters use the same transmission wavelength band but the angle of view varies among the lens sections.

This enables different measurements to be performed on images of the same wavelength by utilizing the difference in angle of view.

In the configuration of the imaging apparatus according to the present technology described above, at least one of the multiple lens sections may correspond to an image formation area size different from an image formation area size for the other lens sections, on the image sensor.

Not only the angle of view but also a resolution or an aspect ratio required may vary for each lens section, and the image formation area on the image sensor for each lens section needs to be located in a geometrically appropriate fashion according to the shape of the image sensor.

In the configuration of the imaging apparatus according to the present technology described above, a wide-angle lens section of the multiple lens sections that has a wider angle of view than the other lens sections may correspond to a larger image formation area size than the other lens sections.

This enables the number of pixels in a wide-angle image to be made larger than the number of pixels in a narrow-angle image.

In the configuration of the imaging apparatus according to the present technology described above, the lens sections for which the wavelength filters use different transmission wavelength bands may be located at different positions in an optical axis direction.

Varying the position of the lens section in the optical axis direction changes a focal position.

In the configuration of the imaging apparatus according to the present technology described above, the lens sections for which the wavelength filters use different transmission wavelength bands may correspond to different thicknesses of the wavelength filter.

Varying the thickness of the wavelength filter changes the focal position of the lens section.

In the configuration of the imaging apparatus according to the present technology described above, the wavelength filter may be disposed in a main body section rather than in a lens barrel section housing the lens section.

This can eliminate the need to secure an arrangement space for the wavelength filter in the lens barrel.

In the configuration of the imaging apparatus according to the present technology described above, the wavelength filter may be formed on an optical low pass filter formed on the image sensor.

Accordingly, the wavelength filter is formed integrally with the optical low pass filter.

In the configuration of the imaging apparatus according to the present technology described above, the image sensor may be configured to enable partial readout and include a gain adjustment section capable of adjusting a gain individually for each partially readout signal.

This enables the gain to be appropriately adjusted for each wavelength.

The configuration of the imaging apparatus according to the present technology described above may include a control section configured to cause the image sensor to execute an exposure operation using a combination of an F-number and a shutter speed determined on the basis of a photometric result, and configured to control the gain adjustment section to cause the gain provided to the readout signal to vary between image formation areas on the image sensor for at least two of the lens sections.

Thus, a single exposure operation enables appropriate gain adjustment according to each wavelength.

In the configuration of the imaging apparatus according to the present technology described above, the lens section may include an image-sided telecentric optical system or a two-sided telecentric optical system.

This makes at least a chief ray on an image side parallel to the optical axis, enabling each chief ray to be prevented from obliquely entering the wavelength filter via the lens section.

In the configuration of the imaging apparatus according to the present technology described above, an image forming lens may be provided between the image-sided telecentric optical system or the two-sided telecentric optical system and the image sensor.

The use of the image forming lens enables adjustment of the position and size of the image formation area provided on the image sensor by the lens section in a case where the image-sided or two-sided telecentric optical system is used.

A lens apparatus according to the present technology includes multiple lens sections each configured to form a subject image in a different area of one image sensor via a different wavelength filter, and at least one of the multiple lens sections has an angle of view different from an angle of view of the other lens sections.

As described above, with the configuration including the multiple lens sections each configured to form a subject image in a different area of the image sensor via a different wavelength filter, multiple image sensors need not be provided to obtain a spectral image for each wavelength. Additionally, in this configuration, at least one of the lens sections has an angle of view different from that of the other lens sections, and hence, different angles of view can be set according to the wavelength.

BRIEF DESCRIPTION OF DRAWINGS

FIG. 4 is an explanatory diagram of a high-resolution image and a low-resolution image in the embodiment.

FIG. 5 is an explanatory diagram of correspondence information in the embodiment.

FIG. 21 is an explanatory diagram of telecentric optical systems.

DESCRIPTION OF EMBODIMENT

An embodiment will be described in the following order:
<1. System Configuration of Embodiment>
<2. Generation of Evaluation Information Based on Sampling Image>
<3. Generation of Presentation Image>
<4. Applied Examples>
<5. Imaging Apparatus in Embodiment>
<6. Exposure Adjustment>
<7. Focusing>
<8. Wavelength Shift Measures>
<9. Lens Apparatus>
<10. Conclusion of Embodiment>
<11. Present Technology>

1. System Configuration of Embodiment

In an example described in an embodiment, sensing of a vegetation state of a farm field is performed.

Figure 1:
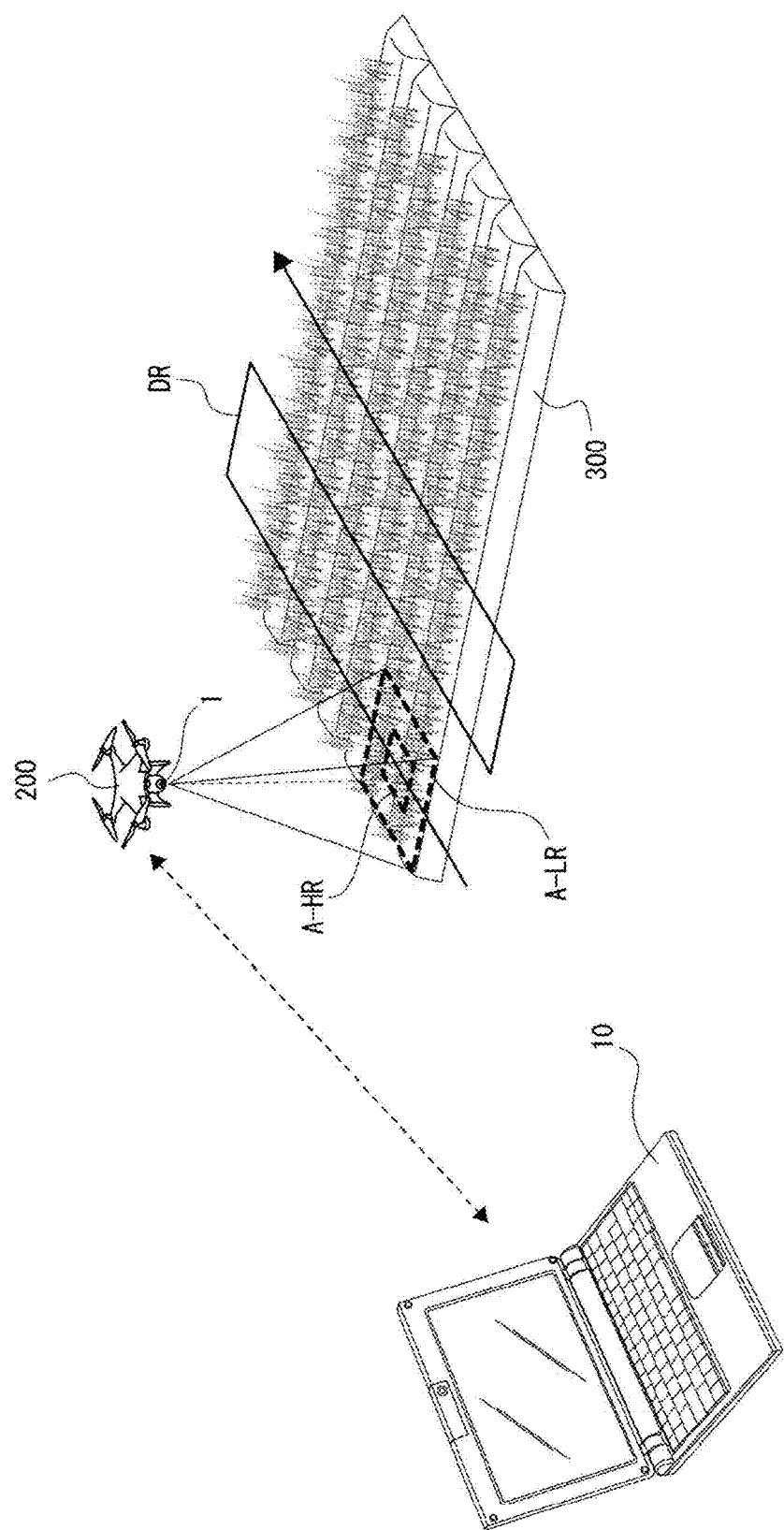
FIG. 1 is an explanatory diagram of remote sensing performed in an embodiment of the present technology.

For example, remote sensing related to the vegetation state of a farm field 300 as a measurement target is assumed to be performed using an imaging apparatus 1 mounted in a flying body 200, as depicted in FIG. 1.

The flying body 200 having a small size can move over the farm field 300, for example, by wireless control by an operator, automatic control, or the like.

In the flying body 200, the imaging apparatus 1 is, for example, set to image a downward view. When the flying body 200 moves over the farm field 300, for example, along a route DR set as depicted by an arrow, the imaging apparatus 1, for example, periodically captures still images.

Here, the imaging apparatus 1 is a multi-spectrum camera that images multiple wavelength bands. For example, the imaging apparatus 1 may be used that captures NIR (Near Infra Red) images and R (red) images and that can calculate an NDVI (Normalized Difference Vegetation Index) from an image obtained. The NDVI is an indicator indicating the distribution status and activity of the vegetation.

Needless to say, this is an example, and the imaging apparatus 1 is only required to image at least two wavelength bands. For example, the imaging apparatus 1 may capture G (green) images, B (blue) images, images of an ultraviolet region, and the like, in addition to the above-described NIR images and R images.

Additionally, the imaging apparatus 1 can capture high-resolution sampling images (hereinafter referred to as "high-resolution images") HR and low-resolution images LR.

The high-resolution image HR is, for example, a captured image in a dashed range A-HR, and the low-resolution image LR is a captured image in a dashed range A-LR.

The high-resolution image HR is obtained by imaging a part of a zone covered by the low-resolution image LR.

Here, a specific configuration example of the imaging apparatus 1 will be described below, the imaging apparatus 1 being used as a multi-spectrum camera that can capture the high-resolution image HR and the low-resolution image LR as described above.

Note that the high-resolution image HR and the low-resolution image LR may be captured at the same time (including approximately the same time) or may be captured at different timings. For example, the high-resolution image HR is captured during the first flight along the route DR, and the low-resolution image LR is captured during the second flight along the route DR.

In the present example, tag information is added to an image captured by the imaging apparatus 1. The tag information includes imaging date and time information, position information (latitude/longitude information) used as GPS (Global Positioning System) data, imaging apparatus information (individual identification information, model information, and the like of the camera), information of each piece of image data (information such as image size, wavelength, and imaging parameters), and the like.

Note that the position information and the imaging date and time information are also used as correspondence information that associates the low-resolution image LR with the high-resolution image HR.

The image data (high-resolution image HR and low-resolution image LR) obtained by the imaging apparatus 1 mounted in the flying body 200 as described above and the tag information are sent to an information processing apparatus 10.

The information processing apparatus 10 uses the image data and the tag information to generate evaluation information using the farm field 300 as a measurement target. Additionally, the information processing apparatus 10 executes processing for presenting evaluation results to a user as images.

The information processing apparatus 10 is implemented, for example, as a PC (personal computer), an FPGA (field-programmable gate array), or the like.

Note that, in FIG. 1, the information processing apparatus 10 is separate from the imaging apparatus 1 but that a unit including the imaging apparatus 1 may internally be provided with an arithmetic apparatus (microcomputer or the like) corresponding to the information processing apparatus 10.

Figure 2:
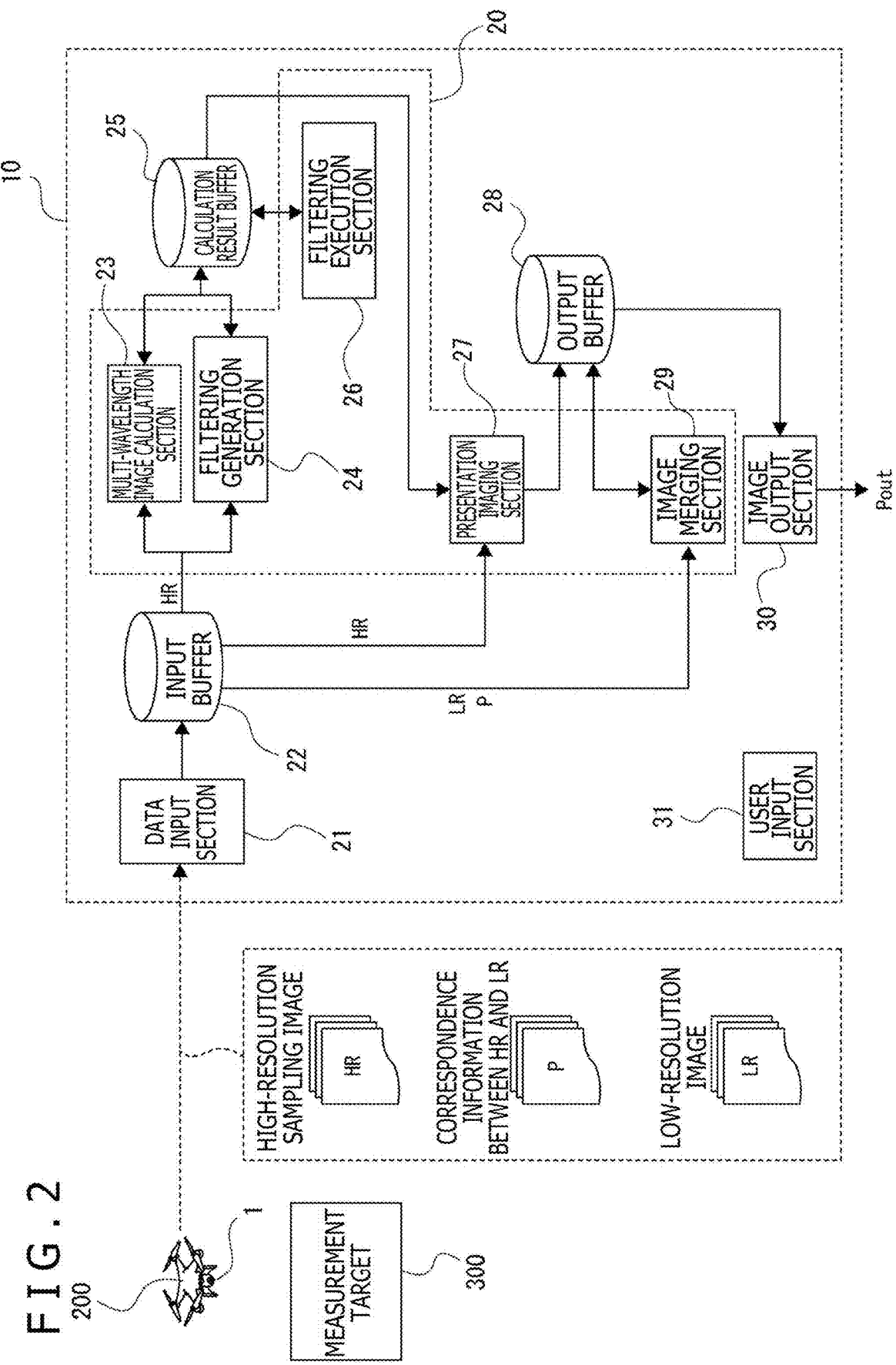
FIG. 2 is a block diagram of a system configuration in the embodiment.

With reference to FIG. 2, a configuration of the information processing apparatus 10 will be described. Note that, as the configuration of the information processing apparatus 10, FIG. 2 depicts, as blocks, for example, software-based arithmetic functions and buffering functions using storage regions.

The information processing apparatus 10 includes a data input section 21, an input buffer 22, a multi-wavelength image calculation section 23, a filtering generation section 24, a calculation result buffer 25, a filtering execution section 26, a presentation imaging section 27, an output buffer 28, an image merging section 29, an image output section 30, and a user input section 31.

Note that the multi-wavelength image calculation section 23, the filtering generation section 24, the filtering execution section 26, the presentation imaging section 27, and the image merging section 29 are depicted to configure a calculation section 20. Each of the sections included in the calculation section 20 may include hardware. However, in the present embodiment, each section will be described as a function implemented by software in a computer apparatus 50 described below.

The data input section 21 acquires, for example, image data (high-resolution image HR and low-resolution image LR) captured by the imaging apparatus 1 mounted in the flying body 200 and tag information to be used as correspondence information P.

Then, the data input section 21 causes the high-resolution image HR, the low-resolution image LR, and the correspondence information P to be stored in the input buffer 22.

Note that the image data acquired by the data input section 21 includes an image data file that is transmitted from the imaging apparatus 1 or a relay apparatus as wired transmission or wireless transmission and received by the information processing apparatus 10, and an image data file that is recorded in a recording medium by the imaging apparatus 1 side or another recording apparatus and acquired by the information processing apparatus 10 reproducing the recording medium.

Additionally, the data input section 21 may acquire captured image data (high-resolution image HR and low-resolution image LR) in real time (during imaging) or at a later point of time. It is sufficient if the image data has been saved in the input buffer 22 at least before the information processing apparatus 10 calculates measurement results.

Additionally, in the present embodiment, the image data file acquired by the data input section 21 is an image obtained by the imaging apparatus 1 operating as a multispectrum camera, and, for example, as the high-resolution image HR depicting one range imaged, includes measurement images of two or more wavelengths.

The multi-wavelength image calculation section 23 performs calculation using signals of wavelength bands in the high-resolution image HR corresponding to a sampling image of the farm field 300 to generate another captured image information (this processing is referred to as "multi-wavelength image calculation"). For example, the multi-wavelength image calculation section 23 can generate NIR image information, NDVI image information, or image information of PRI, VARI, GNDVI, or SIF described below, on the basis of the high-resolution image HR. Note that the type of the captured image information generated by the multi-wavelength image calculation section 23 is not particularly limited to any type.

The filtering generation section 24 uses the high-resolution image HR corresponding to a sampling image of the farm field 300 to generate a filter image that can be used for filtering processing.

The filter image is an image corresponding to information (filtering condition) used as a filter during execution of filtering. In other words, the filter image is an image indicating portions with a particular composition or in a particular state and indicating portions to be extracted by the filtering processing.

In other words, the filtering generation section 24 uses one or more high-resolution images HR to generate a filtering condition for generation of a calculation result image depicting measurement results.

Note that, as described below, the filtering generation section 24 generates a filter image from an image of a particular wavelength band in the high-resolution image HR or from a vegetation index image such as an NDVI image. Alternatively, the filter image generated may be used to generate a further filter image.

The filtering execution section 26 uses the filter image generated by the filtering generation section 24 to generate a filtering result image.

For example, the filtering execution section 26 performs filtering using the filter image, on the captured image information generated by the multi-wavelength image calculation section 23, to generate a filtering result image.

Additionally, the filtering execution section 26 performs filtering using the filter image, on an image of a certain wavelength band in the input high-resolution image HR, to generate a filtering result image.

Further, the filtering execution section 26 can perform, on a filter image, filtering using another filter image, to generate a filtering result image.

The calculation result buffer 25 is used to store the captured image information generated by the multi-wavelength image calculation section 23.

Additionally, the calculation result buffer 25 is also used to store the filter image generated by the filtering generation section 24.

Moreover, the calculation result buffer 25 is also used to store the filtering result image generated by the filtering execution section 26.

The presentation imaging section 27 uses the filtering result image to generate a presentation image.

The filtering result image is obtained by extracting pixels from an unfiltered image in accordance with a condition indicated by the filter image, and may be difficult to understand when viewed by a human user. Hence, the presentation imaging section 27 executes processing to make the filtering result image suitable for presentation to the human user. As described below, the generation processing for the presentation image includes screen splitting or color mapping.

The image merging section 29 executes merging processing for merging the low-resolution image LR with the presentation image generated by the presentation imaging section 27 on the basis of the high-resolution image HR. The image merging section 29 references the correspondence information P for the merging processing.

The output buffer 28 is used to store the presentation image generated by the presentation imaging section 27.

Additionally, the output buffer 28 is also used to store a merged image generated by the image merging section 29.

The image output section 30 outputs image data read out from the output buffer 28 (output image Pout). For example, the presentation image generated by the presentation imaging section 27 or the merged image generated by the image merging section 29 is read out from the output buffer 28 and output by the image output section 30 as an output image Pout.

The output image is, for example, displayed on a monitor display, transmitted to another information processing apparatus, or stored in a storage medium by a storage apparatus.

The output image Pout is an image representing evaluation results based on measurement (remote sensing) of the farm field 300. By viewing the presentation image or the merged image, the user can recognize the state of the farm field 300, the growth situation of plants, and the like.

Note that, although not depicted in the figures, the image output section 30 may execute processing to output, as the output image Pout for display, transmission, storage, or the like, the image information such as vegetation index images, the filter image, and the filtering result image stored in the calculation result buffer 25.

The user input section 31 receives various operation inputs, setting inputs, and the like made by the user.

For example, the user operation specifies turn-on/off of processing functions of the calculation section 20, processing parameters, selection from measurement contents, selection from output images, and the like.

Figure 3:
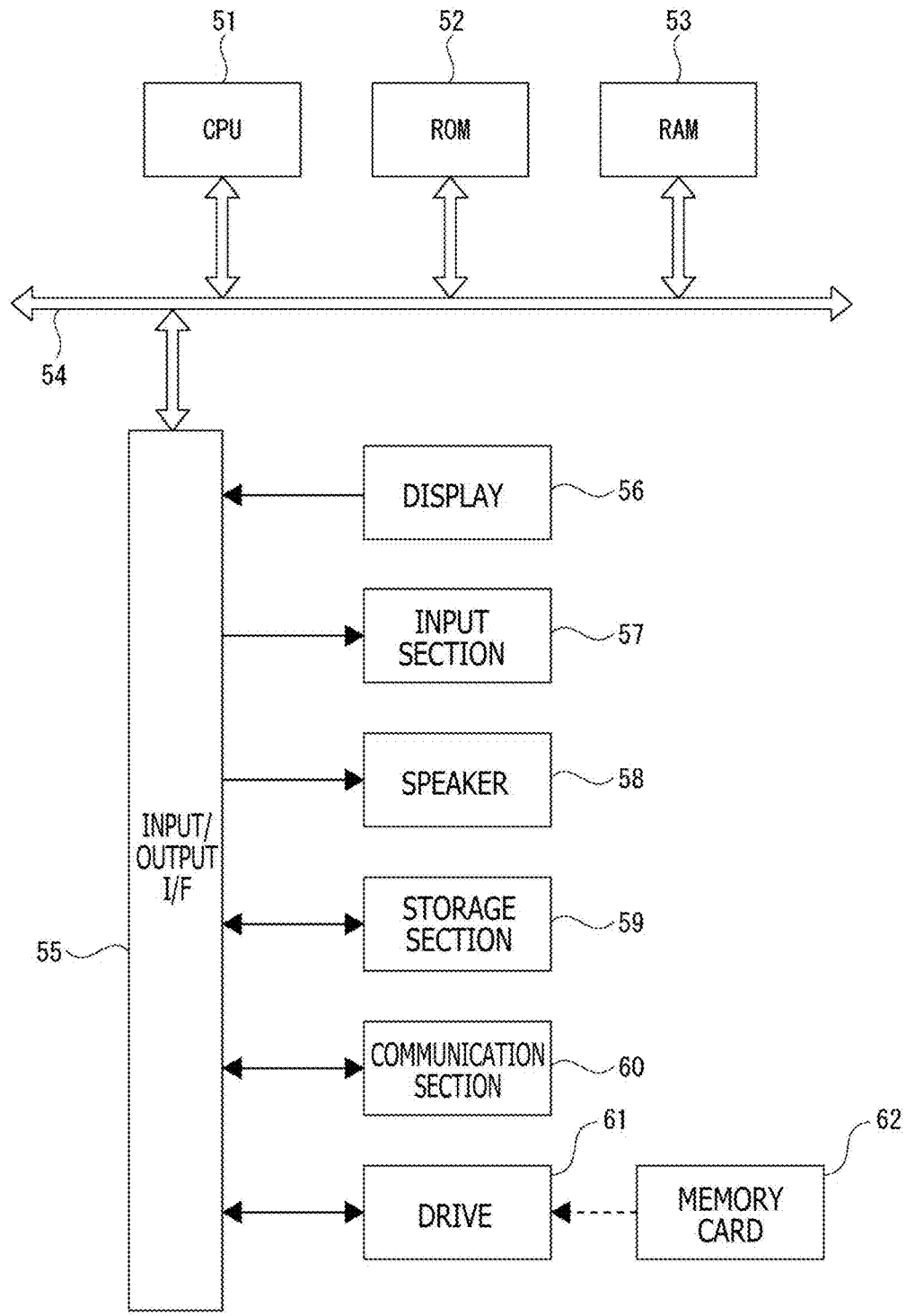
FIG. 3 is a block diagram of a computer apparatus in the embodiment.

The computer apparatus 50 with a hardware configuration as depicted in, for example, FIG. 3 implements the information processing apparatus 10 including the functional configuration as described above and depicted in FIG. 2.

As depicted in FIG. 3, the computer apparatus 50 includes a CPU (Central Processing Unit) 51, a ROM (Read Only Memory) 52, and a RAM (Random Access Memory) 53.

The CPU 51 executes various types of processing in accordance with a program stored in the ROM 52 or a program loaded from a storage section 59 into the RAM 53. The RAM 53 also appropriately stores data required for the CPU 51 to execute various types of processing, and the like.

The CPU 51, the ROM 52, and the RAM 53 are connected together via a bus 54. The bus 54 also connects to an input/output interface 55.

The input/output interface 55 can connect to a display 56 including a liquid crystal panel, an organic EL (Electroluminescence) panel, or the like, an input section 57 including a keyboard, a mouse, and the like, a speaker 58, a storage section 59 including an HDD or the like, a communication section 60, and the like.

The display 56 may be integrated with the computer apparatus 50 or may be equipment separated from the computer apparatus 50. For example, the display 56 displays the output image Pout.

The input section 57 means an input device used by a user using the computer apparatus 50.

The communication section 60 executes communication processing via a network including the Internet and communication with peripheral equipment. For example, the communication section 60 can perform communication with the imaging apparatus 1 and the like.

A drive 61 is connected to and a memory card 62 is installed therethrough in the input/output interface 55 as necessary, and a computer program read out from the memory card 62 is installed in and data processed by the CPU 51 is stored in the storage section 59 as necessary. Needless to say, the drive 61 may be a recording and reproducing drive for a removal storage medium such as a magnetic disk, an optical disk, or a magneto-optic disk.

Such a hardware configuration can execute the processing of the calculation section 20 of the information processing apparatus 10, that is, the processing of the multi-wavelength image calculation section 23, the filtering generation section 24, the filtering execution section 26, the presentation imaging section 27, and the image merging section 29 in FIG. 2. Further, the hardware configuration can execute the processing of the data input section 21 and the image output section 30. That is, the processing described above is implemented by software initiated by the CPU 51. The program constituting the software is downloaded from the network or read out from the removable storage medium, and then installed in the computer apparatus 50 in FIG. 3. Alternatively, the program may be prestored in an HDD or the like used as the storage section 59. Then, the program is initiated in the CPU 51 to activate the functions of the sections described above.

Additionally, the input buffer 22, the calculation result buffer 25, and the output buffer 28 are implemented using, for example, storage regions of the RAM 53 or storage regions of the storage section 59.

The user input section 31 corresponds to a function of the CPU 51 to detect an operation input from the input section 57.

The image data file, the correspondence information P, and the like, used as the high-resolution image HR and the low-resolution image LR, are received by the communication section 60 or loaded from the storage medium by the drive 61 and stored in, for example, the storage section 59. The CPU 51 including the function of the data input section 21 acquires, as a processing target, an image data file required for generation of evaluation results from among image data files and the like loaded as described above.

An image output by the image output section 30 is executed in various forms, for example, output to be displayed on the display 56, stored in the storage section 59, transmitted to external equipment by the communication section 60, or stored in the storage medium such as the memory card 62 by the drive 61.

Note that the information processing apparatus 10 is not limited to a single information processing apparatus (computer apparatus) with a hardware configuration as depicted in FIG. 3 and may include multiple systematized computer apparatuses. The multiple computer apparatuses may be systematized using a LAN or the like or may remotely be arranged via a VPN (Virtual Private Network) utilizing the Internet or the like. The multiple computer apparatuses may include a computer apparatus that can be utilized by a cloud computing service.

Additionally, the computer apparatus 50 in FIG. 3 can be implemented as a personal computer of a desktop type or a notebook type, for example, or a portable terminal such as a tablet terminal or a smartphone. Furthermore, the information processing apparatus 10 can be mounted in electronic equipment such as a measuring apparatus, a television apparatus, a monitor apparatus, an imaging apparatus, or a facility management apparatus including the functions of the computer apparatus 50.

2. Generation of Evaluation Information Based on Sampling Image

An example of evaluation information generation processing that is based on a sampling image and is performed by the information processing apparatus 10 will be described.

First, with reference to FIG. 4, the imaging ranges of the high-resolution image HR and the low-resolution image LR will be described.

In a case where the flying body 200 is used to image the farm field 300, a single large image is obtained by stitching, and thus, multiple images are captured with a certain margin provided in both a vertical direction and a horizontal direction.

FIG. 4A illustrates zones #1 to #5 covered by low-resolution images LR #1 to LR #5. Each of the zones #1 to #5 is a part of the farm field 300 corresponding to a measurement target, and indicates a range covered by one low-resolution image LR. The zones #1 to #5 partially overlap. The overlaps correspond to the ranges imaged as marginal portions of the low-resolution images LR #1 to LR #5.

Here, only the zones #1 to #5 are depicted, but by continuously capturing low-resolution images LR subsequent to the low-resolution image LR #5 while flying along the route DR indicated in FIG. 1, a required number of low-resolution images LR are obtained that cover the entire farm field 300. Then, by executing stitching processing on the low-resolution images LR, an image of the entire farm field 300 can be generated.

Note that the zones #1, #2, . . . in the farm field 300 are determined by an angle of view of the imaging apparatus 1 and a flight altitude of the flying body 200, and are not fixed segments.

Meanwhile, the high-resolution image HR is captured with a missing portion in one of or both the vertical direction and the horizontal direction.

FIG. 4B depicts high-resolution images HR #1 to HR #5 that are obtained by imaging discrete sample zones #1C to #5C.

Here, the sample zone #1C is a generally central area of the zone #1 in FIG. 4A. However, the sample zone #1C need not necessarily be a generally central area of the zone #1 and is at least an area within the zone #1.

Similarly, the sample zones #2C to #5C are areas respectively included in the zones #2 to #5 (for example, generally central areas).

In this manner, one high-resolution image HR is obtained by imaging a sample zone included in the imaging zone of the corresponding low-resolution image LR.

Note that high-resolution images HR are also sequentially captured during the flight along the route DR over the farm field 300, but even when the high-resolution images HR are collected at a point of time after imaging of the entire farm field 300, the high-resolution image of the entire farm field 300 cannot be generated by stitching because the collected high-resolution images HR are images of the respective discrete sample zones.

In the present example, for the high-resolution images HR, the discrete sample zones are imaged as described above to allow the large farm field 300 to be efficiently imaged, and for the zones #1, #2, . . . , the high-resolution images HR are used to allow the sample zones #1C, #2C, . . . to be precisely analyzed and calculated to obtain evaluation results.

Now, an example of the correspondence information P is illustrated using FIG. 5.

The correspondence information P is information that associates the imaging zones of the high-resolution image HR with the imaging zones of the low-resolution image LR as described above.

For example, a case is considered in which, for example, the imaging apparatus 1 simultaneously captures the low-resolution image LR and the high-resolution image HR. In this case, as depicted in FIG. 5, the correspondence information P is a file of a table describing file names and coordinates indicating a range of angle of view of the high-resolution image HR in the low-resolution image LR.

For example, the table as the illustrated correspondence information P includes a set of an image data file File1 of the high-resolution image HR #1 and an image data file File2 of the low-resolution image LR #1, and the set of the image data files is associated with start coordinates Start #1 (x1, y1) and end coordinates End #1 (x2, y2) indicating the range of angle of view of the high-resolution image HR in the low-resolution image LR.

Similarly, an image data file File3 of the high-resolution image HR #2 and an image data file File4 of the low-resolution image LR #2 are associated with start coordinates Start #2 (x1, y1) and end coordinates End #2 (x2, y2) indicating the range of angle of view of the high-resolution image HR in the low-resolution image LR.

There is a technology that records, in an image file, information of a place imaged using a GPS. In that case, the position information can be utilized as the correspondence information between the imaging range of the high-resolution image HR (sample zone #1C or the like) and the imaging range of the low-resolution image LR (zone #1 or the like).

Additionally, in a case where the low-resolution image LR and the high-resolution image HR are simultaneously captured during a single flight, imaging date and time information is added to each piece of image data, and the resultant image data can be used as the correspondence information P. In other words, the imaging date and time information indicating the same point of time associates the imaging range of the high-resolution image HR (sample zone #1C or the like) with the imaging range of the low-resolution image LR (zone #1 or the like).

Description will be given of an example of processing by the information processing apparatus 10 using the high-resolution image HR, the low-resolution image LR, and the correspondence information P as described above.

Specifically, description will be given of processing by the multi-wavelength image calculation section 23, the filtering generation section 24, the filtering execution section 26, and the presentation imaging section 27.

First, the multi-wavelength image calculation section 23 reads out, from the input buffer 22, the required high-resolution image HR to be processed. Then, on the basis of the readout high-resolution image HR, the multi-wavelength image calculation section 23 generates another captured image information and stores it in the calculation result buffer 25. Here, an example of another captured image information is a vegetation index image. In this case, the multi-wavelength image calculation section 23 performs a vegetation index calculation on the basis of the high-resolution image HR to be processed and stores, in the calculation result buffer 25, a vegetation index image corresponding to a calculation result.

As a specific example, the multi-wavelength image calculation section 23 reads out, from the input buffer 22, an image of a wavelength of 660 nm (R image) and an image of a wavelength of 800 nm (NIR image). Then, the multi-wavelength image calculation section 23 generates an NDVI image from the R image and the NIR image. For example, NVDI is calculated as follows:

$$NDVI = (1 - (R/NIR))/(1 + (R/NIR))$$

The NDVI image has pixel values each corresponding to an NDVI value calculated for a respective set of corresponding pixels in the R image and in the NIR image.

Note that, in the described example, the NDVI is determined as a vegetation index but that this is an example and any other vegetation index may be determined as described below. Needless to say, in the case where any other vegetation index is determined, different images (wavelength bands or the like) may be read out from the input buffer 22.

Now, the filtering generation section 24 will be described below. The filtering generation section 24 reads out, from the input buffer 22, the required high-resolution image HR to be processed and generates a filter image (image indicating portions with a particular composition or in a particular state) for filtering. Then, the filtering generation section 24 stores the generated filter image in the calculation result buffer 25.

As an example, as the filter image, three filter images FP1, FP2, and FP3 are generated using an image of a wavelength of 800 nm (NIR image) or an NDVI image.

The filter image FP1 is an image indicating sunny portions in the high-resolution image HR. For example, the filter image FP1 is an image generated by extracting, from the NIR image, pixels with a certain NIR value (pixel value) or larger. Specifically, the filter image FP1 is an image with only sunny portions expressed as high-luminance pixels (for example, white pixels). The filter image FP1 is stored in the calculation result buffer 25.

The filter image FP2 is an image indicating vegetational portions detected in the high-resolution image HR. The filter image FP2 is an image with plant portions expressed as high-luminance pixels (for example, white pixels) and the other portions (for example, soil portions) expressed as low-luminance pixels (for example, black pixels).

First, an NDVI image is generated or acquired. For example, the filtering generation section 24 reads out an NIR image and an R image from the input buffer 22. Then, the filtering generation section 24 generates an NDVI image from the R image and the NIR image. Note that, in a case where the multi-wavelength image calculation section 23 has generated an NDVI image and stored it in the calculation result buffer 25, the filtering generation section 24 may read out the NDVI image.

Then, the filtering generation section 24 extracts, from the NDVI image, pixels with a certain NDVI value or larger. The filtering generation section 24 thus generates an image with only the vegetational portions expressed as high-luminance pixels. The filter image FP2 is stored in the calculation result buffer 25.

The filter image FP3 is an image indicating vegetational and sunny portions detected in the high-resolution image HR. The filter image FP3 is generated using the filter images FP1 and FP2 and is an image in which particular portions corresponding to vegetational and sunny portions are expressed as high-luminance pixels (for example, white pixels), with the other portions expressed as low-luminance pixels (for example, black pixels).

In this case, it is sufficient if an AND condition is applied to corresponding pixels between the filter images FP1 and FP2 (pixels located at the same position) to obtain a high-luminance pixel. That is, when, in the filter images FP1 and FP2, high-luminance pixels are assumed to be "1" and low-luminance pixels are assumed to be "0," the AND condition is applied to the filter images FP1 and FP2 at each pixel position to determine "1" or "0" to provide a corresponding pixel for the filter image FP3. Thus, an image is obtained in which vegetational and sunny portions are expressed as high-luminance pixels. The filter image FP3 is stored in the calculation result buffer 25.

Here, the three filter images FP1, FP2, and FP3 are illustrated. However, according to filtering for various purposes, filter images with more variation may be generated as described below.

That is, the filter image is an image indicating portions with a particular composition or in a particular state and indicating portions to be extracted by filtering processing, and hence, a variety of filter images are possible according to a filtering condition.

The filtering execution section 26 reads out, from the calculation result buffer 25, a vegetation index image or a filter image to be processed and executes filtering processing. This processing uses a filter image indicating portions with a particular composition or in a particular state to extract corresponding portions (pixels) from a vegetation index image. The filtering execution section 26 stores, in the calculation result buffer 25, an image corresponding to a filtering result (filtering result image).

A specific example of filtering will be described. Here, in a described example, an NDVI image as a vegetation index image and the filter image FP3 are read out from the calculation result buffer 25 and subjected to filtering.

As described above, the filter image FR3 is an image indicating portions with a particular composition or in a particular state and indicating vegetational and sunny portions detected in the high-resolution image HR.

The filtering processing is processing for extracting, from the NDVI image, pixels corresponding to portions indicated by the filter image FP3. The filtering result image is stored in the calculation result buffer 25.

Consequently, the filtering result image is an image obtained by extracting, from the high-resolution image HR, portions to be measured or portions suitable for measurement.

For example, a technology is available in which, when the vegetation index (for example, the NDVI) is measured, a light source spectrum (sunlight) is measured simultaneously with measurement with the camera to correct measurement results from the camera in order to suppress variation in the light source spectrum. In this case, more accurate measurement can be achieved by allowing shadow portions to be eliminated (many of such portions are shadows of leaves of plants, which have complicated light source spectra under the effect of unique absorption or reflection of light by the leaves). The filtering result image illustrated above is an image obtained by extracting pixels meeting conditions for such accurate measurement.

Needless to say, the filtering processing may be varied according to the purpose of the measurement. For example, the vegetation index image is filtered using the filter image FP1 or FP2 described above.

Additionally, another filter image may be used. For example, a filter image that depicts shaded portions is assumed. In particular, shaded portions under communities are likely to be shaded throughout the day, and in the sense of measuring the potential of photosynthesis of communities, more accurate measurement can be achieved by limiting the measurement to sunny portions rather than the shaded portions. Given this, for example, the vegetation index image such as the NDVI image may be filtered using a filter image depicting shaded portions.

The filtering result image obtained by the filtering processing by the filtering execution section 26 as described above is an image depicting portions with a particular composition or in a particular state, the composition and the state being included in vegetation indexes, and the filtering result image indicates one measurement result.

Such a filtering result image may be saved in an appropriate recording medium as a measurement result or may be read out from the calculation result buffer 25 and output from the image output section 30.

Needless to say, both the original high-resolution image HR or the like and the filtering result image may be saved, or exclusively the filtering result image may be saved. Furthermore, the user may be allowed to select whether to save both the high-resolution image HR or the like and the filtering result image or only the filtering result image.

3. Generation of Presentation Image

Here, the filtering result image may not be very appropriate for the user as an image depicting a measurement result for the measurement target. In other words, for human eyes, the meaning of the image may be difficult to understand.

Accordingly, in the present example, processing by the presentation imaging section 27 allows generation and output of a presentation image making the measurement result easy to understand when the human user views the image.

The presentation imaging section 27 reads out, from the calculation result buffer 25, the filtering result image or the like to be processed, executes presentation imaging processing on the filtering result image or the like, and stores, in the output buffer 28, a presentation image generated by the presentation imaging processing.

A specific example of the presentation imaging processing will be described.

The presentation imaging processing generates an image by dividing the filtering result image into areas on the basis of a certain unit, and mapping a color to a representative value for the pixels included in each division area (color mapping).

For example, the filtering result image is divided into multiple areas such as 16 areas. Then, for each of the division areas, whether or not pixels extracted by the filtering processing are present is checked, and in a case where extracted pixels are present, a representative value for the pixels in the area is calculated. The representative value as used herein refers to the average value, maximum value, minimum value, center-of-gravity value, largest number value, or the like of a vegetation index for the pixels preset in the area. Here, the representative value is, for example, the average value.

The presentation imaging section 27 performs "color mapping" using calculated representative values (average values). The "color mapping" as used herein refers to presetting colors corresponding to respective numerical ranges, selecting a color according to a calculated average value, and assigning the color to the pixels.

For example, NDVI values are set in advance as follows:
Less than 0.700: dark green
From 0.700 to 0.710: green
From 0.710 to 0.720: yellowish green
From 0.720 to 0.745: yellow
From 0.746 to 0.760: orange
From 0.761 to 0.770: dark orange
From 0.771 to 0.799: red
0.800 or more: dark red Then, the color is determined according to the average value.

Then, the color corresponding to the average value is allocated to each area in which the pixels extracted by the filtering processing as described above are present. In other words, all the pixels in the area correspond to the color of interest.

Meanwhile, a background color is allocated to areas in which no pixels extracted by the filtering processing are present. For example, in a case where the background color is white, all the pixels in the area are white.

In this manner, a presentation image is generated in which a color is mapped to each area according to the representative value of the vegetation index. In such a color mapping image, the vegetation index (average value) for each area is expressed by color, allowing the user to easily understand the vegetation status of each area.

Note that the presentation image obtained by the presentation imaging processing described above is an image in the imaging range of the high-resolution image HR.

Such a presentation image can further be subjected to image merging utilizing the low-resolution image LR to obtain as an output image Pout an image expressing the entire measurement target of the farm field 300.

The merging is executed by the image merging section 29.

Specifically, the merged image as used herein is generated by overlaying (merging of a translucent presentation image) or overwriting (merging of an opaque presentation image), with the presentation image as a color mapping image described above, a positionally corresponding image area (imaging target area of the presentation image) of the entire image of the measurement target generated by stitching of low-resolution images LR #1, LR #2, LR #3, . . . , and LR #LN obtained by imaging zones #1, #2, #3, . . . , and #LN (although not depicted in the drawing, "LN" is assumed to be the number of the last zone) of the farm field 300.

For example, such a merged image expresses, for each zone imaged using the low-resolution image LR, a measurement result (evaluation result) obtained from the high-resolution image HR. In other words, the user can check the representative value such as the average value or the maximum value of the measurement result for each zone in the farm field 300.

In particular, in a case where a merged image that is overlaid with a presentation image with colors mapped thereto on the basis of average values is obtained, the status of each zone is easily recognized. Such a merged image allows visibility to be improved when a general trend is observed in a bird's eye view in a case where the sampling measurement has a low coverage.

Additionally, with a merged image overlaid with a presentation image with colors mapped thereto on the basis of maximum values, for example, zones with well grown plants, zones to look out for, and the like are more easily recognized, though it depends on the vegetation index used. For example, visibility can be improved in discovering a small abnormal portion.

Note that, in the above-described example, the low-resolution image LR is an RGB image, but that the application of the low-resolution image LR corresponding to an RGB image is not limited to the merging with the presentation image as described above. For example, a single RGB low-resolution image LR can be used as the output image Pout which is an image depicting the actual visibility of the farm field 300.

4. Applied Examples

Note that, in the above description, the NDVI is adopted as an example of another captured image information generated by the multi-wavelength image calculation section 23, but that various indexes can be used as the captured image information. For example,
PRI,
magnitude of chlorophyll fluorescence,
state transition reflectance, and the like can be used as the captured image information.

The PRI is an indexed spectral reflectance varied by de-epoxidation of a xanthophyll cycle. The xanthophyll cycle is a mechanism that releases as heat an excessive quantity of light energy for photosynthesis as in stomatal closure caused by strong light or water stress.

Here, the PRI is calculated as follows:

$$PRI=(R531-R570)/(R531+R570)$$

Note that "R531" denotes a reflected light intensity at a wavelength of 531 nm and "R570" denotes a reflected light intensity at a wavelength of 570 nm.

The magnitude of chlorophyll fluorescence may be the magnitude of solar-induced chlorophyll fluorescence (SIF) or may be obtained by inducing chlorophyll fluorescence using laser or an LED instead of sunlight. Measurement under sunlight generally uses FLD (Fraunfofer Line-Discrimination (sun dark lines)).

Stress detection can be performed using the chlorophyll fluorescence. The chlorophyll fluorescence is fluorescence emitted from a plant during photosynthesis in the plant, and is a phenomenon in which, for higher plants, in a case where energy is not extracted, within a certain time, from a reaction center where electrons are optically induced, energy is emitted as fluorescence of a wavelength of approximately 680 to 770 nm.

Released energy is from 0.5% to 3% of the energy of input light and varies according to the state of photosynthesis in the plant. The variation occurs in a case where an excessive quantity of light energy for photosynthesis is present as in stomatal closure caused by strong light or water stress.

Further examples of the vegetation index include a GNDVI (Green Normalized Difference Vegetation Index) and a visible atmospherically resistant index (VARI).

The visible atmospherically resistant index (VARI) is an index for emphasizing the vegetation in the visible portion of the spectrum while mitigating a difference in sunlight and the effect of the atmosphere, and is calculated by (Green−Red)/(Green+Red−Blue).

Additionally, a thermal image or a CWSI (Crop Water Stress Index) using thermal is also applicable.

Additionally, in the above description, the measurement target is the vegetation in the farm field 300. However, this is an example. For example, the present technology is also applicable to vegetation observation for grass in an athletic field such as a soccer field or a baseball field, vegetation observation for natural grassland, a forest, or an old-growth forest, and the like.

Additionally, the measurement technology using the multi-spectrum camera described above is applicable not only to sensing of vegetation or the like but also in various fields.

For example, assumed is a system that is used in life science to measure motion of cells by sampling measurement.

In addition, the present technology is also applicable in the field of medical testing based on imaging such as endoscopic images, microscopic images, or fundus examination images.

Additionally, the present technology is also applicable in the field of infrastructure inspection.

For example, as mega solar inspection, zones in which solar panels are arranged can be searched for defective portions by remote sensing using the flying body 200. In this case, the sampling measurement with the high-resolution image HR in the embodiment is effective.

Additionally, also in a case where, as concrete crack inspection, target zones are searched for defective portions by remote sensing using the flying body 200, the sampling measurement with the high-resolution image HR in the embodiment is effective.

5. Imaging Apparatus in Embodiment

Now, the imaging apparatus 1 as the embodiment will be described.

Figure 6:
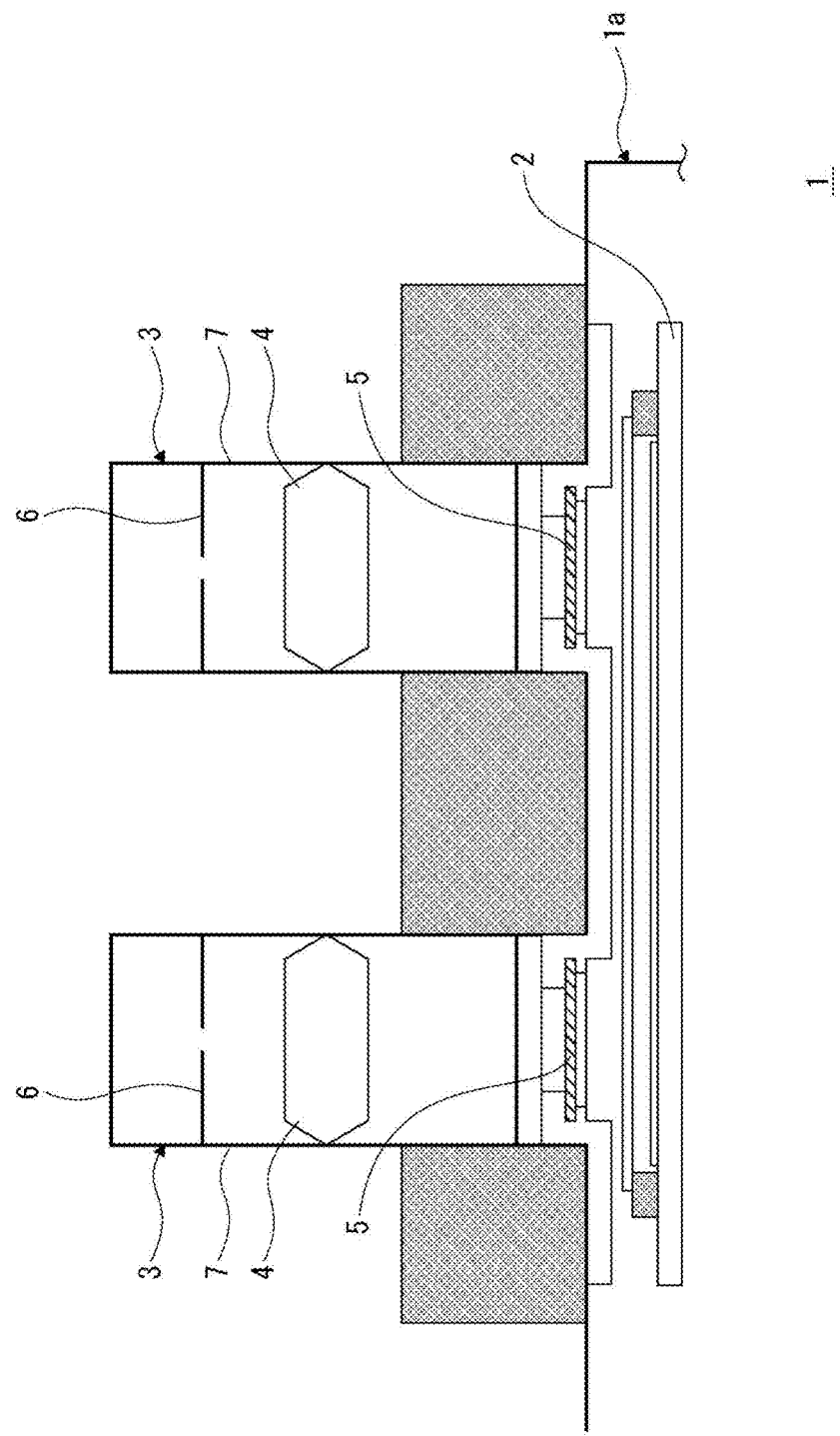
FIG. 6 is a schematic cross-sectional structure diagram of an imaging apparatus in the embodiment.

FIG. 6 is a schematic cross-sectional structure diagram of the imaging apparatus 1. Note that, for convenience of description, a side on which the subject is positioned is hereinafter designated as a front side, whereas the opposite side (image sensor 2 side) is designated as a rear side.

The imaging apparatus 1 is configured as an imaging apparatus integrated with a lens and includes multiple lens sections 4 each configured to form a subject image in a different area of the image sensor 2 via a different wavelength filter 5 in order to enable wavelength spectral images to be simultaneously captured.

As depicted in the figure, the respective lens sections 4 are disposed in different lens barrels 7. Each lens barrel 7 is a cylindrical portion internally housing optical components for imaging including the lens section 4. As depicted in the figure, along with the lens section 4, the wavelength filter 5 and an aperture mechanism 6 are disposed in the lens barrel 7.

Here, in the figure, the lens section 4 is expressed as one lens but in practice includes a combination of multiple lenses. In the figure, the lens section 4 is disposed succeeding the aperture mechanism 6. However, this is only for convenience of illustration, and in practice, some of the lenses constituting the lens section 4 are also disposed in front of the aperture mechanism 6 in the lens barrel 7.

The wavelength filter 5 is an optical filter that selectively transmits light of a predetermined wavelength band. In the present embodiment, at least one of the wavelength filters 5 provided for the respective lens sections 4 is assumed to have a selective wavelength band (transmission wavelength band) different from that of the other wavelength filters 5.

The wavelength filter 5 allows a subject image of a different wavelength band to be formed in a different area of the image sensor 2 for each lens section 4.

Here, specific forms of the wavelength filter 5 may include an LPF (low pass filter), an HPF (high pass filter), a BPF (band pass filter), a dual BPF, a triple band pass filter, and the like.

The image sensor 2 is, for example, of a CMOS (Complementary Metal Oxide Semiconductor) type or a CCD (Charge Coupled Device) type and is disposed in a main body section 1a of the imaging apparatus 1. The main body section 1a refers to a portion of the imaging apparatus 1 that is located behind a portion of the imaging apparatus 1 in which the lens barrel 7 is formed.

Note that, here, two lens sections 4 are depicted but that the number of the lens sections 4 is not limited to two and may be three or more.

Additionally, FIG. 6 depicts an example in which each wavelength filter 5 is disposed in the lens barrel 7, but the wavelength filter 5 can be provided in the main body section 1a.

Here, in the configuration in the embodiment, the imaging apparatus 1 includes the multiple lens sections 4 each configured to form a subject image in the different area of the image sensor 2 via the different wavelength filter 5 as described above, and at least one of the multiple lens sections 4 has an angle of view different from that of the other lens sections 4.

Figure 7:
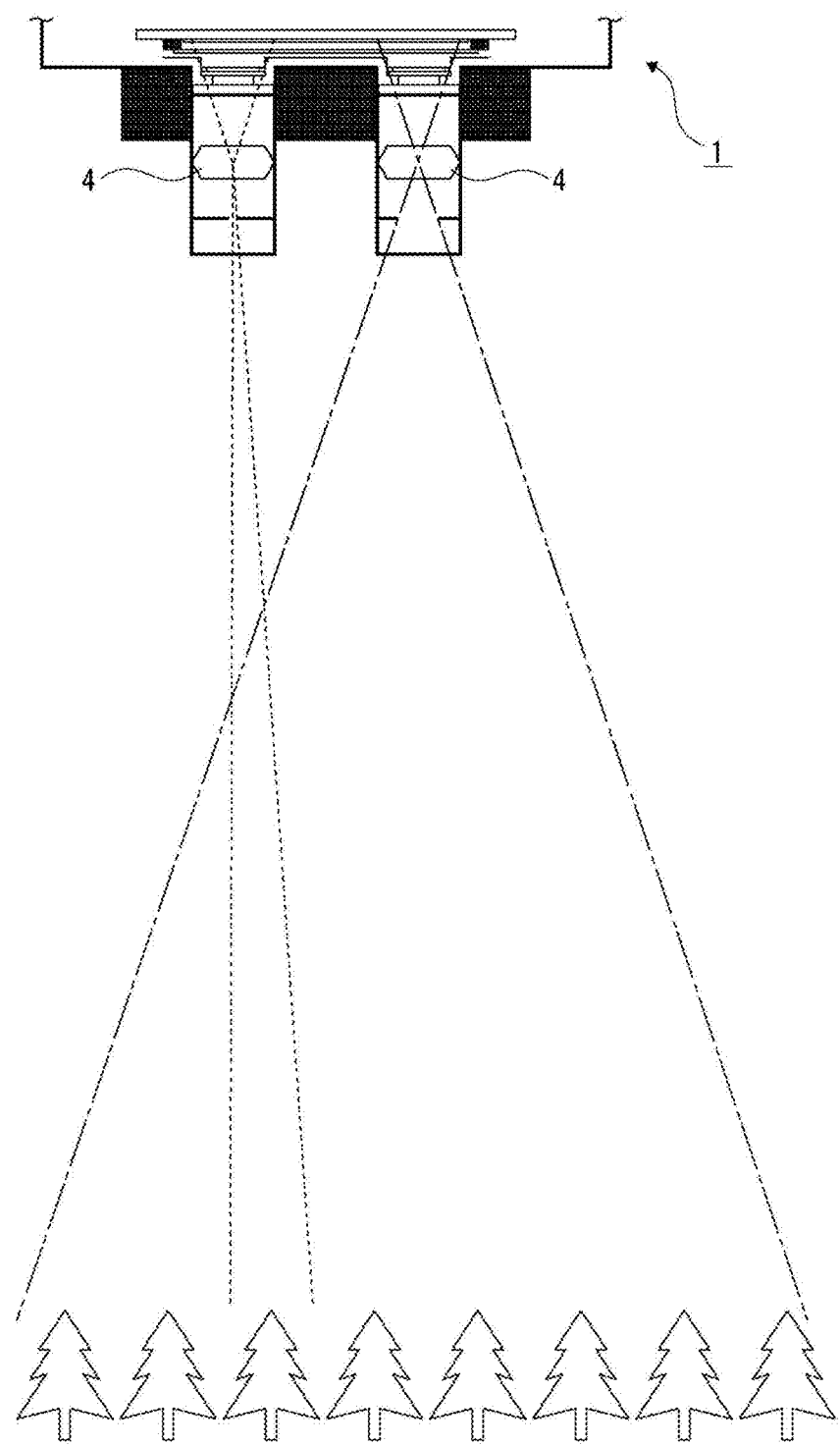
FIG. 7 is an explanatory diagram of an angle of view for each lens section in the embodiment.

FIG. 7 is an explanatory diagram of the angle of view of each lens section 4.

In the example illustrated in FIG. 7, one of the two lens sections 4 has a wider angle of view than the other.

Note that, as seen in FIG. 7, the wide-angle lens section 4 is suitable for capturing the low-resolution image LR described above, and the narrow-angle lens section 4 is suitable for capturing the high-resolution image HR (see FIG. 4 described above).

Figure 8:
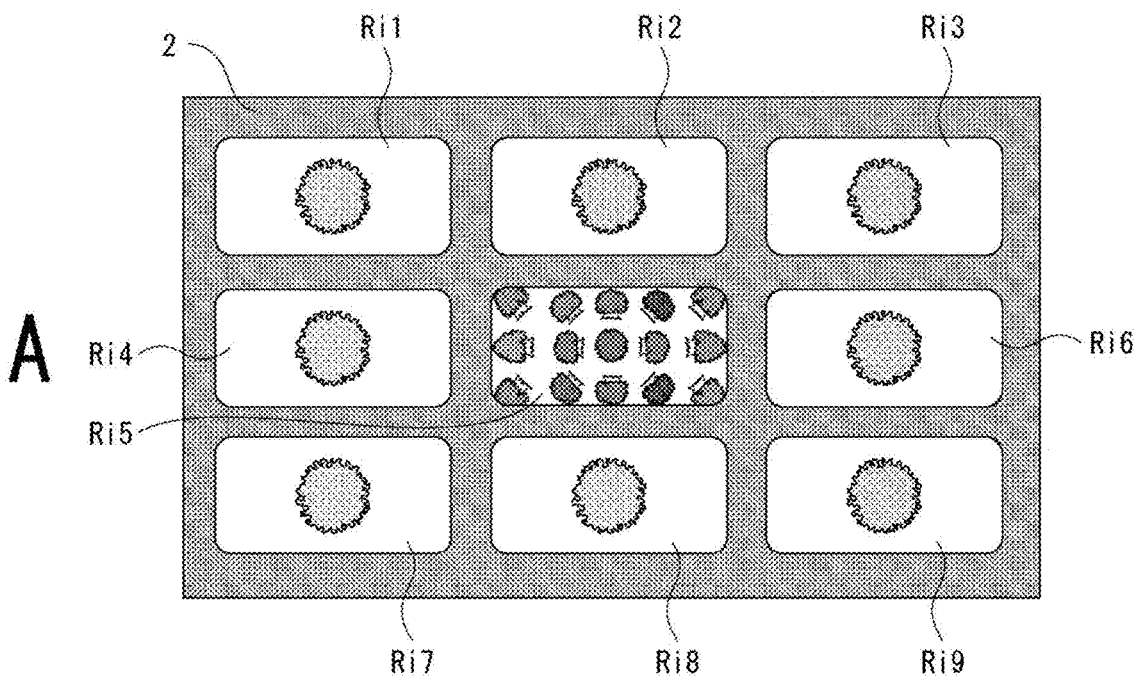
FIG. 8 is a diagram schematically depicting image formation areas for the respective lens sections in the embodiment.

FIG. 8 is a diagram schematically depicting an example of an image formation area Ri for each lens section 4 on the image sensor 2.

As an example, FIG. 8 depicts an example of the image formation area Ri obtained in a case where nine lens sections 4 are provided. The image formation areas Ri for the respective lens sections 4 are distinguished from one another by numbers 1 to 9 appended to the reference sign.

FIG. 8A schematically illustrates an arrangement example of image formation areas Ri1 to Ri9 on the image sensor 2, and FIG. 8B illustrates a breakdown for wavelength filter characteristics and the angles of view for the respective image formation areas Ri.

In the example in FIG. 8, of the image formation areas Ri1 to Ri9, only the image formation area Ri5 located at the center has a wide angle of view, whereas the other image formation areas Ri have a narrow angle of view. As illustrated in FIG. 8A, in a case where the measurement target is, for example, trees, the wide-angle image formation area Ri5 includes multiple trees, and each narrow-angle image formation area Ri includes a smaller number of trees than the wide-angle image formation area Ri5, and for example, each narrow-angle image formation area Ri includes one tree.

Additionally, in the example in FIG. 8, the image formation area Ri1 has a wavelength division "Blue," and the wavelength filter 5 used has a CWL (Center Wavelength) of 460 nm and an FWHM (Full Width at Half Maximum) of 30 nm. Additionally, the image formation area Ri2 has a wavelength division "Red," and the wavelength filter 5 used has, for example, a CWL of 660 nm and an FWHM of 20 nm.

Further, the image formation area Ri3 has a wavelength division "Red Edgh2," and the wavelength filter 5 used has, for example, a CWL of 715 nm and an FWHM of 10 nm, and the image formation area Ri4 has a wavelength division "Green1," and the wavelength filter 5 used has, for example, a CWL of 535 nm and an FWHM of 20 nm.

The wide-angle image formation area Ri5 has a wavelength division "RGB," and as the wavelength filter 5, an RGB filter is used.

Here, the RGB filter is a wavelength filter that separately transmits R, G, and B light for each pixel of the image sensor 2. The wavelength filter 5 used as an RGB filter is not disposed in the lens barrel 7 as illustrated in FIG. 6 described above but is formed as a set of on-chip color filters arranged for the respective pixels of the image sensor 2.

For confirmation, the wavelength filter 5 disposed in the lens barrel 7 as illustrated in FIG. 6 functions as a wavelength filter that transmits light of a predetermined wavelength band for the entire irradiation light traveling to the image formation area Ri provided by the corresponding lens section 4.

In the present example, for the wavelength filters 5 for the image formation areas Ri1 to Ri9 other than the image formation area Ri5, the wavelength filter 5 that performs wavelength filtering of a predetermined wavelength band for the entire irradiation light traveling to the image formation area Ri is thus used.

Here, even in a case where the lens section 4 corresponds to the image formation area Ri with the wavelength division "RGB," the lens barrel 7 can be internally provided with a wavelength filter that transmits light of a predetermined wavelength band for the entire irradiation light traveling to the image formation area Ri. Specifically, as in normal RGB cameras, a wavelength filter such as a UV/IR cut filter that cuts light of a predetermined wavelength band can be provided.

The image formation area Ri6 has a wavelength division "NIR1," and the wavelength filter 5 used has, for example, a CWL of 755 nm and an FWHM of 5 nm, and the image formation area Ri7 has a wavelength division "Green2," and the wavelength filter 5 used has, for example, a CWL of 570 nm and an FWHM of 20 nm. Further, the image formation area Ri8 has a wavelength division "Red Edgh1," and the wavelength filter 5 used has, for example, a CWL of 695 nm and an FWHM of 10 nm, and the image formation area Ri9 has a wavelength division "NIR2," and the wavelength filter 5 used has, for example, a CWL of 763 nm and an FWHM of 5 nm.

Note that, for "NIR1" described above, the wavelength filter 5 of a CWL of 757 nm and an FWHM of 1 nm can also be used and that, for "NIR2" described above, the wavelength filter 5 of a CWL of 761 nm and an FWHM of 1 nm can also be used.

Here, FIG. 8 depicts an example in which the image formation areas Ri have the same size (corresponding to the size of an image circle). However, as depicted in FIG. 9, the image formation area Ri provided by at least one lens section 4 can have a size different from that for the other lens sections 4.

Figure 9:
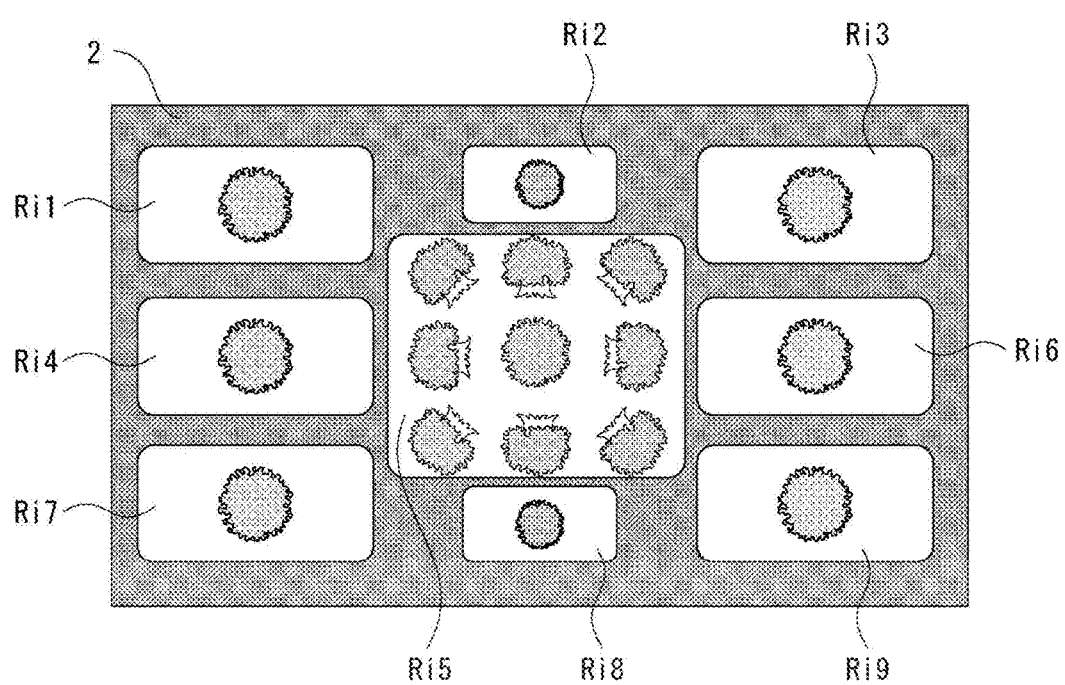
FIG. 9 is an explanatory diagram of an example in which the image formation area provided by at least one lens section has a size different from the size of the image formation areas provided by the other lens sections.

Specifically, in the example in FIG. 9, compared to the case in FIG. 8A, the wide-angle image formation area Ri5 has a larger size and thus a larger number of pixels (to suppress a decrease in resolution), and the image formation areas Ri2 and Ri8 located above and below the image formation area Ri5 have a smaller size.

Not only the angle of view but also the resolution or aspect ratio required may vary with the lens section 4 (with wavelength), and each image formation area Ri should be located on the image sensor 2 in a geometrically appropriate fashion according to the shape of the image sensor 2.

In the case where the image formation area Ri for at least one lens section 4 has a size different from that for the other lens sections 4 as described above, the appropriate resolution and the appropriate aspect ratio of the image formation area Ri can be set for each lens section 4, and the image formation area Ri for each lens section 4 can appropriately be located according to the shape of the image sensor 2.

Additionally, in the example in FIG. 8, the angle of view varies among the lens sections 4 for which the wavelength filters 5 use different transmission wavelength bands. However, the angle of view may vary among the lens sections 4 for which the wavelength filters 5 use the same transmission wavelength band.

Figure 10:
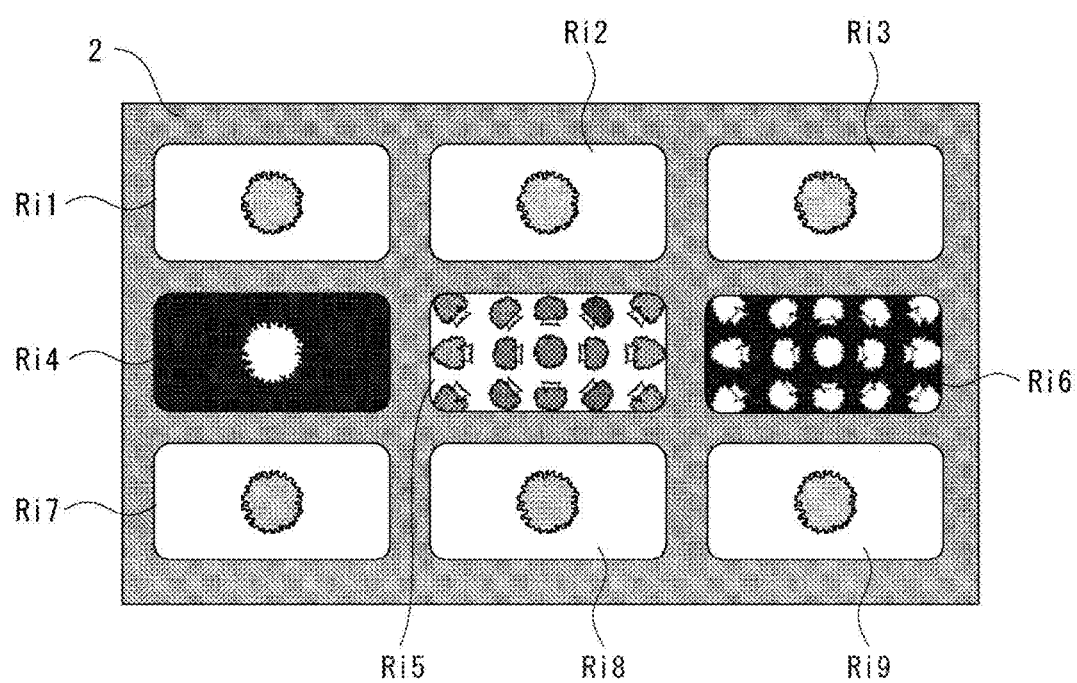
FIG. 10 is an explanatory diagram of an example in which the lens sections for which wavelength filters use the same transmission wavelength band have different angles of view.

FIG. 10 illustrates an example. In the example in FIG. 10, the lens section 4 corresponding to the image formation area Ri4 and the lens section 4 corresponding to the image formation area Ri6 correspond to the same transmission wavelength band of the wavelength filter 5 but have different angles of view.

In this manner, with the angle of view varied among the lens sections 4 for which the wavelength filters 5 use the same transmission wavelength band, different measurements can be performed on images of the same wavelength by utilizing the difference in angle of view. For example, the wide-angle image allows an object corresponding to the measurement target to be subjected to 3D measurement as performed using a stereo camera and measurement of the shape of the object as viewed from immediately above or obliquely sideward (utilizing the fact that, for a wide-angle image, the object appears obliquely at ends of the image).

6. Exposure Adjustment

Here, in the case where a configuration is adopted in which the lens sections 4 form respective subject images on one image sensor 2 as in the present embodiment, shutter speed cannot be varied for each lens section 4. Meanwhile, the energy of light transmitted may vary significantly among the wavelength filters 5 of different transmission wavelength bands.

Accordingly, how to set the exposure of the camera should be considered.

In this regard, the energy of light for each of the lens sections 4 is also affected by the spectral reflectance of the measurement target. Specifically, for example, for plants, reflectance varies significantly between Red and NIR, and a relation NIR»Red is observed under sunlight. Accordingly, in a case where images are captured with the same shutter speed and sensitivity (gain: ISO), NIR images may be overexposed, whereas Red images may be underexposed.

Additionally, the light energy for each lens section 4 is also affected by the FWHM of the wavelength filter 5. For example, the light energy obtained after transmission varies significantly between the case of FWHM=50 nm and the case of FWHM=10 nm.

Figure 11:
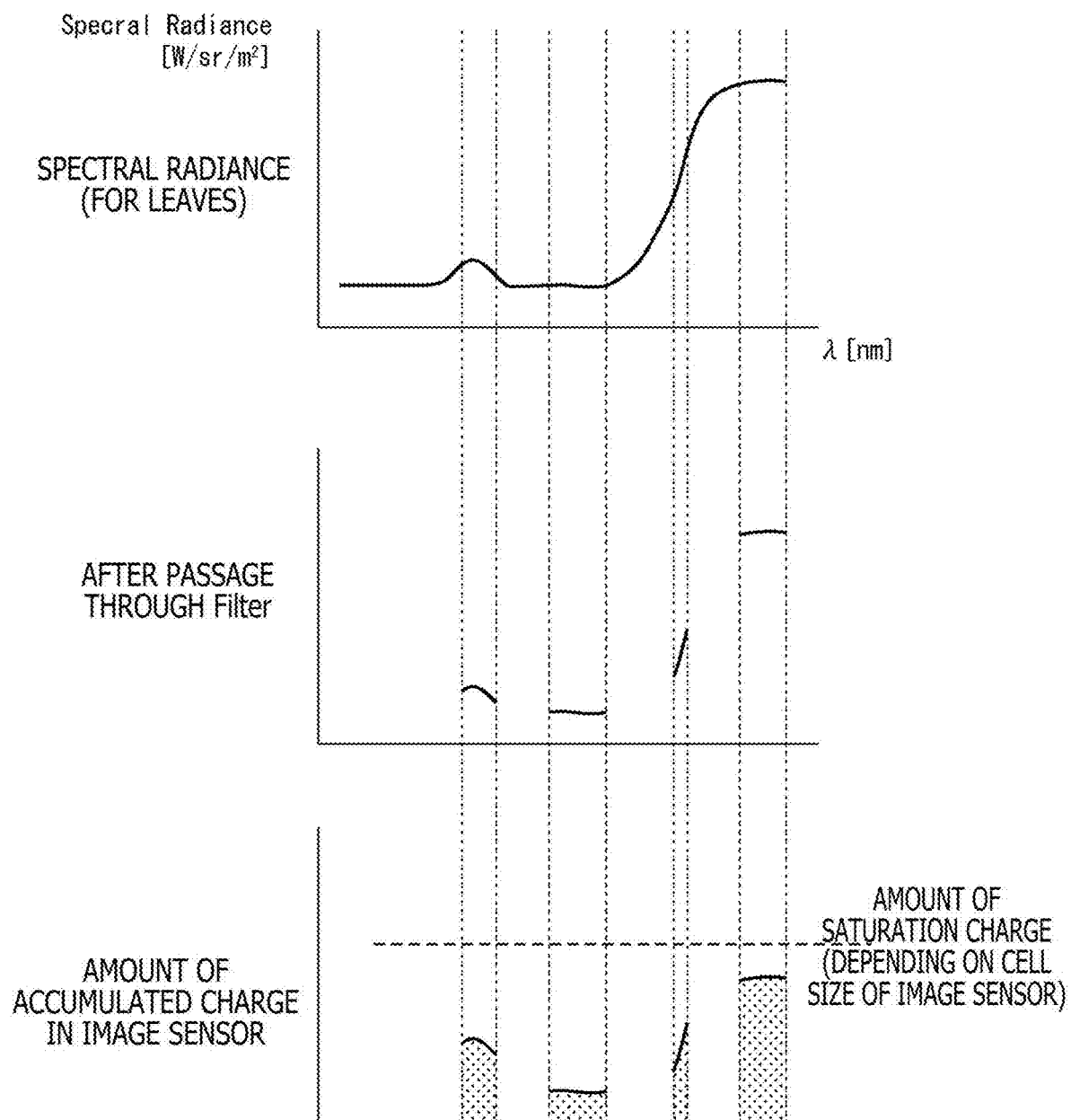
FIG. 11 is an explanatory diagram depicting a variation in the amount of accumulated charge among wavelengths.

FIG. 11 schematically illustrates an example of spectral radiance in a case where the measurement target is a leaf, an example of light energy obtained after transmission in a case where reflected light from the leaf is transmitted through the wavelength filters 5 of different transmission wavelength bands (four wavelength filters 5 in this case), and an example of the amount of charge accumulated in the image sensor 2 when the image sensor 2 receives light transmitted through the wavelength filters 5.

As illustrated in the figure, under a certain exposure setting, the amount of accumulated charge varies with the wavelength; a large amount of charge is accumulated for light of a particular wavelength band (represented by the area of a portion with pearskin finish), whereas a small amount of charge is accumulated for light of another wavelength band.

The amount of accumulated charge is ideally made as close to the amount of saturation charge as possible in terms of an SNR (Signal-to-Noise Ratio).

Accordingly, the F-number may be adjusted, that is, the aperture diameter may be adjusted by the aperture mechanism 6 in such a manner that, for each lens section 4, the light energy obtained after transmission through the wavelength filter 5 is made as close as possible.

Note that the adjustment of the F-number is not the only technique by which, for each lens section 4, the light energy obtained after transmission through the wavelength filter 5 is made as close as possible, and that a technique by which the lens section 4 is provided with an ND (Neutral Density) filter that is used to adjust a dimming rate can be adopted.

Additionally, a gain may be adjusted to absorb a variation in light energy obtained after transmission.

Figure 12:
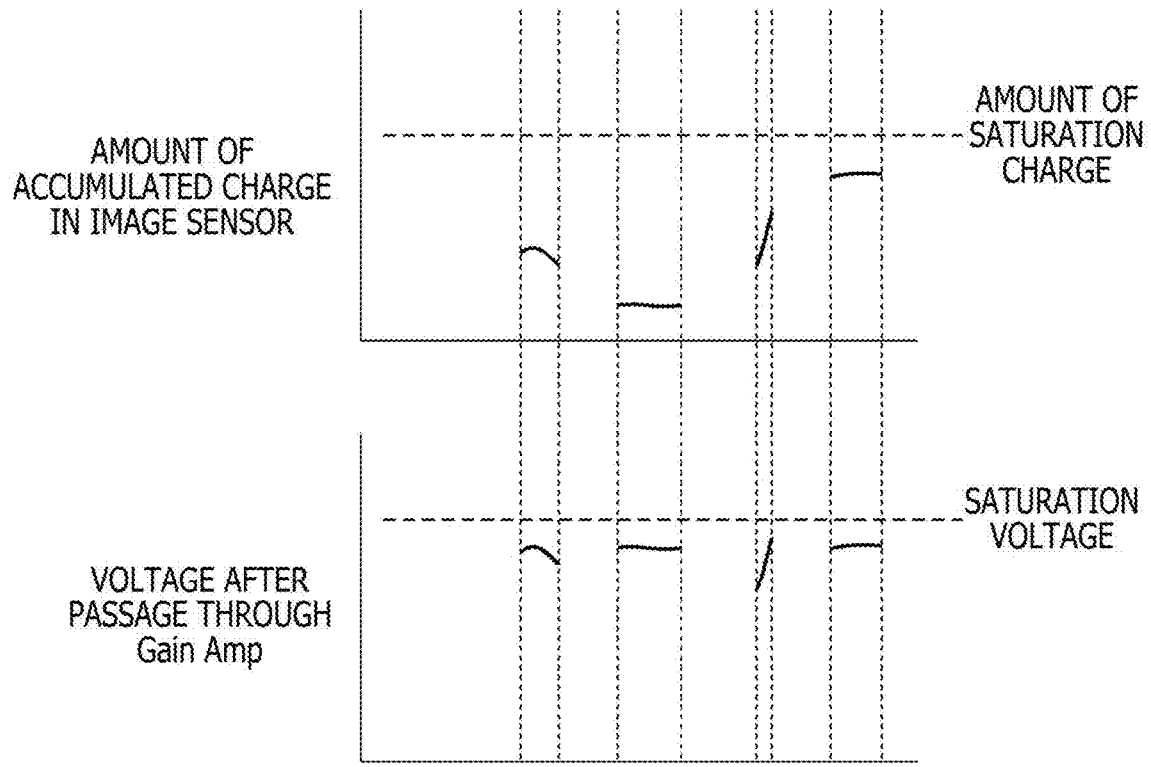
FIG. 12 is a diagram schematically illustrating an example of gain adjustment in the embodiment.

FIG. 12 schematically illustrates an example of gain adjustment.

As illustrated in the figure, the gain is adjusted for each lens section 4 (for each image formation area Ri) to an extent that a charge signal is not saturated.

Figure 13:
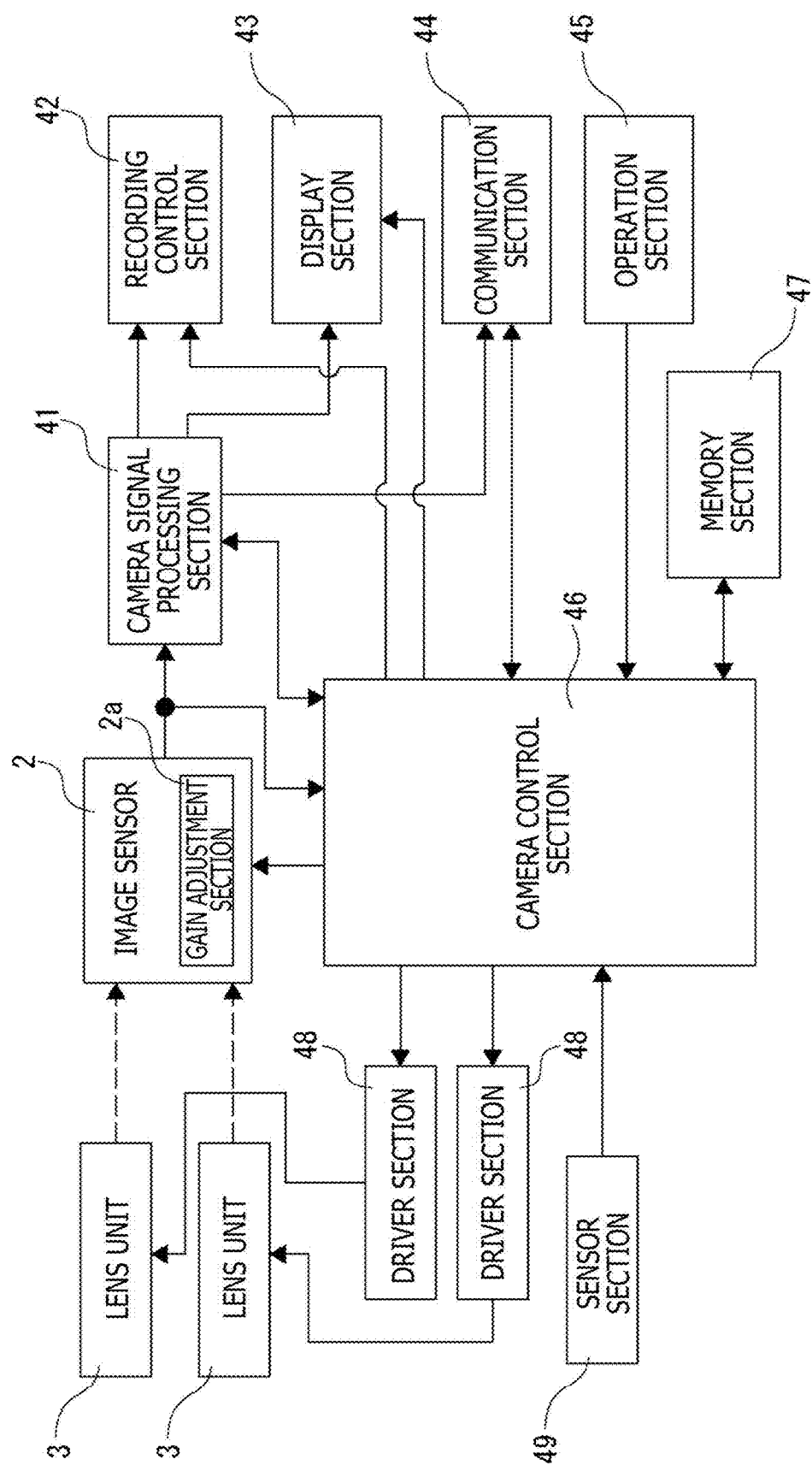
FIG. 13 is a block diagram depicting an electrical configuration example of the imaging apparatus as the embodiment.

FIG. 13 is a block diagram depicting an electrical configuration example of the imaging apparatus 1 for implementing the adjustment of the F-number and the gain adjustment as described above.

As depicted in the figure, in addition to the multiple lens units 3 and the image sensor 2 described above, the imaging apparatus 1 includes a camera signal processing section 41, a recording control section 42, a display section 43, a communication section 44, an operation section 45, a camera control section 46, a memory section 47, multiple driver sections 48, and a sensor section 49.

Each of the lens units 3 includes the lens section 4, the aperture mechanism 6, and the like described above. Here, the lens constituting each lens section 4 includes a focus lens for focus adjustment.

In the figure, for convenience of illustration, two lens units 3 are provided. However, as understood from the above description, three or more lens units 3 can be provided.

The image sensor 2 is configured as the CMOS type, the CCD type, or the like as described above. The image sensor 2 is provided with an electric circuit section that executes, for example, CDS (Correlated Double Sampling) processing or A/D (Analog/Digital) conversion processing on an electrical signal obtained by photoelectric conversion. The image sensor 2 outputs an imaging signal corresponding to digital data obtained by A/D conversion processing, to the camera signal processing section 41 and the camera control section 46, which are located succeeding the image sensor 2.

Here, the image sensor 2 in the present embodiment is configured to enable the charge signal to be partially read out. The partial readout function enables the charge signal to be read out by specifying only some of the multiple image formation areas Ri as a target.

Additionally, the image sensor 2 includes a gain adjustment section 2a that adjusts the gain of the charge signal read out from each pixel. The above-described partial readout function enables the gain adjustment section 2a to provide a different gain to each image formation area Ri.

The camera signal processing section 41 is configured as an image processing processor using, for example, a DSP (Digital Signal Processor) or the like. The camera signal processing section 41 executes various types of signal processing on digital signals (captured image signals) from the image sensor 2.

The camera signal processing section 41 executes processing for generating a file for recording or for communication by performing compressive encoding, formatting, generation and addition of meta data, and the like for recording or for communication, on the captured image signals having been subjected to various types of signal processing, as file formation processing. For example, the camera signal processing section 41 generates, as still image files, image files in formats such as JPEG (Joint Photographic Experts Group), TIFF (Tagged Image File Format), and GIF (Graphics Interchange Format). Additionally, the camera signal processing section 41 may generate image files in an MP4 format used to record videos and sounds in compliance with MPEG-4.

Note that the camera signal processing section 41 may generate image files as RAW image data.

The camera signal processing section 41 in the present example executes such file formation processing on a captured image signal of each image formation area Ri. In other words, the camera signal processing section 41 individually generates an image file for captured images of each image formation area Ri.

The recording control section 42 performs recording and reproduction on a recording medium including, for example, a nonvolatile memory. The recording control section 42 executes, for example, processing for recording an image such as still image data and meta data in the recording medium.

The recording control section 42 may be provided in a variety of forms in practice. For example, the recording control section 42 may be configured as a flash memory built in the imaging apparatus 1 and a write/read circuit for the flash memory. Alternatively, the recording control section 42 may be in the form of a card recording and reproduction section that accesses, for recording or reproduction, a recording medium that can be installed in and removed from the imaging apparatus 1, for example, a memory card (portable flash memory or the like). Further alternatively, the recording control section 42 may be implemented as a form in which the recording control section 42 is built in the imaging apparatus 1, e.g., as the form of an HDD (Hard Disk Drive) or the like.

The display section 43 performs various types of information display and corresponds to a display panel or a view finder including a display device such as a liquid crystal panel (LCD: Liquid Crystal Display) or an organic EL (Electro-Luminescence) display which is disposed in a housing of the imaging apparatus 1.

The display section 43 causes various types of display to be performed on a display screen on the basis of an instruction from the camera control section 46.

For example, the display section 43 causes display of a reproduced image of image data read out from the recording medium by the recording control section 42.

Alternatively, the display section 43 may be provided with image data of a captured image with the resolution converted for display by the camera signal processing section 41, and in response to an instruction from the camera control section 46, the display section 43 may perform display on the basis of the image data of the captured image (display of what is generally called a through image).

Further, on the basis of an instruction from the camera control section 46, the display section 43 causes display, on the screen, of various operation menus, icons, messages, and the like, that is, display as a GUI (Graphical User Interface).

The communication section 44 comprehensively illustrates various communication devices and communication processing circuits mounted in the imaging apparatus 1. Communication established by the communication section 44 can include communication via a network corresponding to an external communication network (external network communication) and local communication with peripheral equipment.

Specifically, the communication section 44 may be a configuration operating as a network communication section and including some or all of a function to perform communication using a mobile network, for example, 4G, 5G, or the like, an Internet connection, a home network, LAN (Local Area Network), or the like, a function to perform short-range wireless communication such as Bluetooth (registered trademark), Wi-Fi (registered trademark) communication, NFC (Near Field Communication), or the like, a function to perform infrared communication or the like, a function to perform wired connection communication with other equipment, and the like.

The operation section 45 collectively represents input devices used by the user to input various operations. Specifically, the operation section 45 represents various operators (keys, dials, a touch panel, a touch pad, and the like) provided in the housing of the imaging apparatus 1. The operation section 45 detects an operation input by the user and sends, to the camera control section 46, a signal corresponding to the input operation.

The camera control section 46 includes a microcomputer (arithmetic processing device) including a CPU.

The memory section 47 includes a storage device, for example, a ROM, a RAM, a flash memory, or the like to store information and the like used for processing by the camera control section 46. The memory section 47 may be a memory region built in a microcomputer chip operating as the camera control section 46 or may include a separate memory chip.

The camera control section 46 executes programs stored in the ROM, flash memory, or the like of the memory section 47 to control the whole imaging apparatus 1.

For example, the camera control section 46 controls the shutter speed and the gain (ISO sensitivity) in the image sensor 2. Additionally, the camera control section 46 gives an instruction regarding various signal processing operations in the camera signal processing section 41, controls an imaging operation and a recording operation performed according to an operation input by the user and a reproduction operation for reproducing a recorded image file, performs control of operations of the lens units 3 such as adjustment of the focus or aperture (F-number), performs control related to data communication such as setting of user interface operations, a communication scheme of the communication section 44, and a transmission destination, and the like.

The RAM in the memory section 47 is used as a work area for various data processing operations of the CPU of the camera control section 46, to temporarily store data, programs, and the like.

The ROM and flash memory (nonvolatile memory) of the memory section 47 are used to store an OS (Operating System) for the CPU to control the respective sections, content files such as image files, application programs for various operations, firmware, various pieces of setting information, and the like.

The various pieces of setting information stored include, for example, communication setting information, information related to exposure setting, shutter speed setting, and mode setting as setting information related to the imaging operation, setting information for the operation system, setting information for the display system, and the like.

Each of the driver sections 48 is provided for a respective one of the lens units 3 and is provided with, for example, a motor driver for a focus lens driving motor, a motor driver for a motor for the aperture mechanism 6, and the like.

Each of the motor drivers applies a drive current to a corresponding driver according to an instruction from the camera control section 46, to cause execution of movement of a zoom lens, opening and closing of aperture blades of the aperture mechanism 6, and the like.

The sensor section 49 collectively represents various sensors mounted in the imaging apparatus 1. The sensor section 49 mounted includes, for example, an IMU (inertial measurement unit) that can, for example, detect an angular velocity by using an angular velocity (gyro) sensor for three axes of pitch, yaw, and roll and detect acceleration by using an acceleration sensor. Additionally, the sensor section 49 mounted may include, for example, a position information sensor, an illuminance sensor, and the like.

Here, the camera control section 46 controls each driver section 48 to adjust the F-number of each lens unit 3 to a corresponding F-number, to thereby implement the adjustment of the F-number as described above, that is, the adjustment of the F-number for making the light energy obtained after transmission through each wavelength filter 5 as close as possible.

Further, the gain adjustment described with reference to FIG. 12 is implemented by the camera control section 46 controlling the gain adjustment section 2a. Specifically, while causing the image sensor 2 to perform partial readout for each image formation area Ri, the camera control section 46 controls the gain adjustment section 2a in such a manner as to perform, on the readout signal for each image formation area Ri, amplification processing with the corresponding gain.

At this time, for the gain adjustment for each image formation area Ri utilizing the partial readout function, a technique described below can be adopted. That is, for AE (Auto Exposure) control elements as "shutter speed" and "F-number," photometric processing is executed using a technique similar to that for normal cameras to set a common "F-number" and a common "shutter speed" with which photoelectric conversion elements (for example, photodiodes) are unsaturated for all the image formation areas Ri, and therefore, the appropriate gain is given to each image formation area Ri by using the partial readout function.

Figure 14:
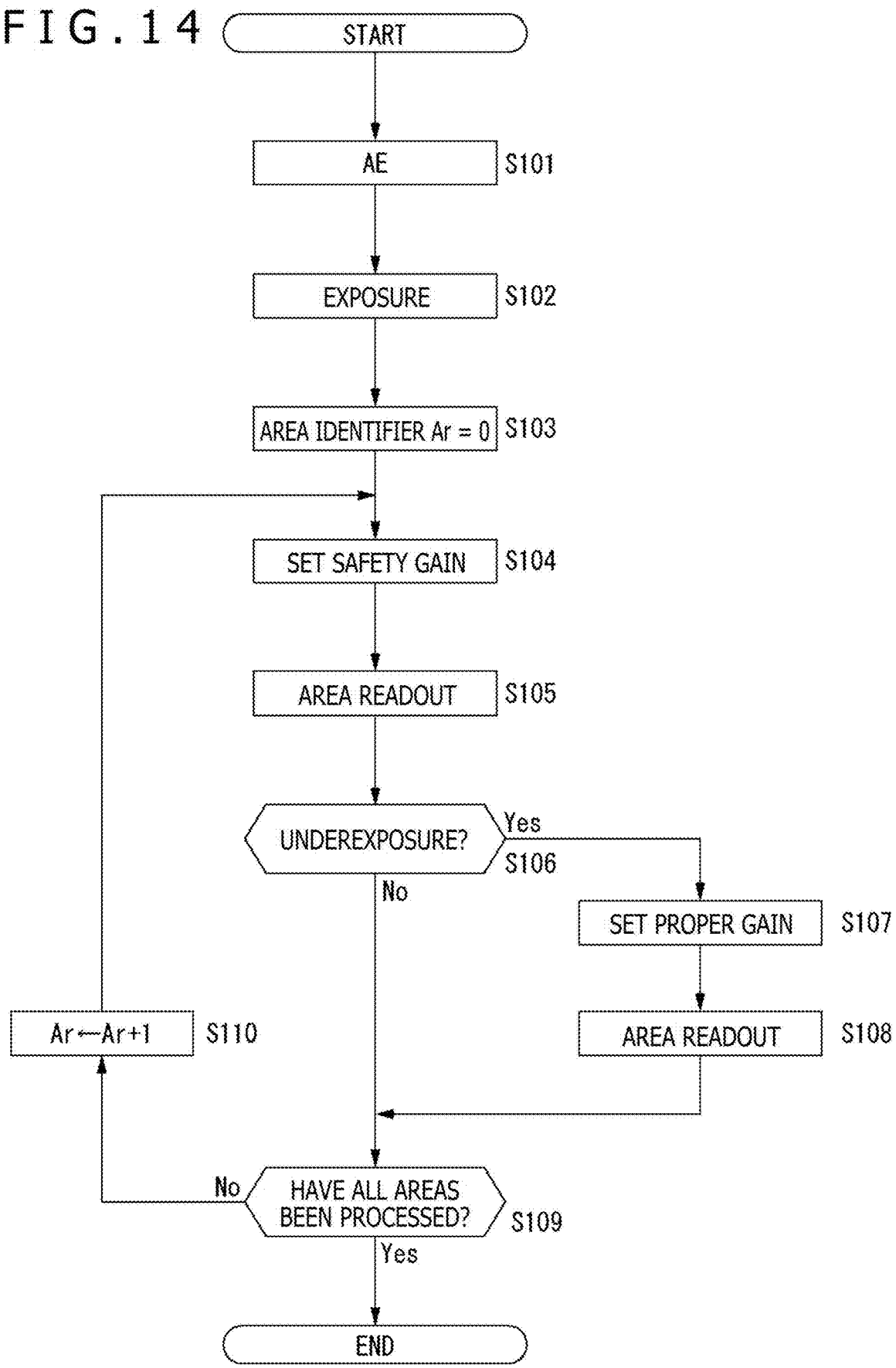
FIG. 14 is a flowchart illustrating a processing example of exposure control as the embodiment.

A flowchart in FIG. 14 illustrates a specific processing example.

First, in step S101, the camera control section 46 executes AE processing. The AE processing includes causing the exposure operation and the readout operation to be performed on an area including all the image formation areas Ri in the image sensor 2, executing photometric processing on the basis of the resultant captured image signal, and determining, on the basis of photometric results, a combination of the common "F-number" and "shutter speed" with which the photoelectric conversion elements are unsaturated for all the image formation areas Ri.

Note that the photometric processing executed during the AE processing in step S101 uses any one of the schemes such as "spot metering," "center-weighted metering," and "multipattern metering." In this case, which of the photometric schemes is used for the photometric processing can be selected on the basis of image recognition results. For example, the photometric scheme may be selected according to the type of the subject, or the like. Alternatively, scene recognition using image recognition or the like may be used to execute photometric processing on a particular subject.

In step S102 following step S101, the camera control section 46 executes exposure processing. In the exposure processing, the image sensor 2 is caused to perform the exposure operation on the basis of the exposure setting including the combination of the "F-number" and "shutter speed" determined by the AE processing in step S101.

In step S103 following step S102, the camera control section 46 resets an area identifier Ar to 0. The area identifier Ar is a value for identifying the image formation area Ri as a processing target.

In response to resetting the area identifier Ar to 0, the camera control section 46 proceeds to step S104 to execute, as safety gain setting processing, processing for setting a gain as a predetermined safety gain in the gain adjustment section 2a. Here, the safety gain is a gain set to a value low enough to prevent the charge signal from being saturated for the image formation area Ri indicated by the area identifier Ar. The safety gain is considered to be a gain calculated, for the image formation area Ri indicated by the area identifier Ar, on the basis of the photometric results in step S101 and the values of the "F-number" and "shutter speed" determined on the basis of the photometric results. Alternatively, the safety gain can have a fixed value, for example, the minimum value.

In step S105 following step 3104, the camera control section 46 causes the image sensor 2 to execute, as area readout processing, partial readout on the image formation area Ri indicated by the area identifier Ar.

Then, in step S106 following step S105, the camera control section 46 determines whether or not the image is underexposed. Specifically, the camera control section 46 determines whether or not the captured image obtained by the area readout processing in step S105 (captured image having been subjected to the gain adjustment using the safety gain in step S104) is underexposed.

In the case of determining the captured image to be underexposed, the camera control section 46 proceeds to step S107 to execute proper gain setting processing. Specifically, for the captured image of the image formation area Ri indicated by the area identifier Ar, the camera control section 46 executes processing for calculating the gain satisfying such a condition that the underexposure state can at least be eliminated and setting the gain in the gain adjustment section 2a.

Then, in subsequent step S107, the camera control section 46 causes the image sensor 2 to execute, as area readout processing, re-readout for the image formation area Ri indicated by the area identifier Ar. This provides, for the image formation area Ri as a processing target, a captured image having been subjected to the gain adjustment using the proper gain.

In response to executing the processing in step S108, the camera control section 46 advances the processing to step S109.

Meanwhile, in the case of determining the captured image as not being underexposed in step S106, the camera control section 46 advances the processing to step S109 by skipping the processing in steps S107 and S108.

In step S109, the camera control section 46 determines whether or not the processing is completed for all areas, that is, whether or not the processing in step S104 and subsequent steps described above has been executed for all of the image formation areas Ri.

In the case where the processing is not completed for all the areas, the camera control section 46 increments the area identifier Ar by one in step S110 and returns to step S104. Accordingly, processing is executed for obtaining a captured image with the proper gain for the next image formation area Ri.

In the case of determining that the processing is completed for all the areas in step S109, the camera control section 46 completes the series of processing operations illustrated in FIG. 14.

The processing as described above allows a captured image having been subjected to the gain adjustment using the proper gain corresponding to the characteristics of the captured image of each image formation area Ri to be obtained. Further, the above-described processing requires only one exposure operation (except the exposure during the photometric processing) in obtaining a captured image having been subjected to the gain adjustment using the proper gain for each image formation area Ri in this manner.

Figure 15:
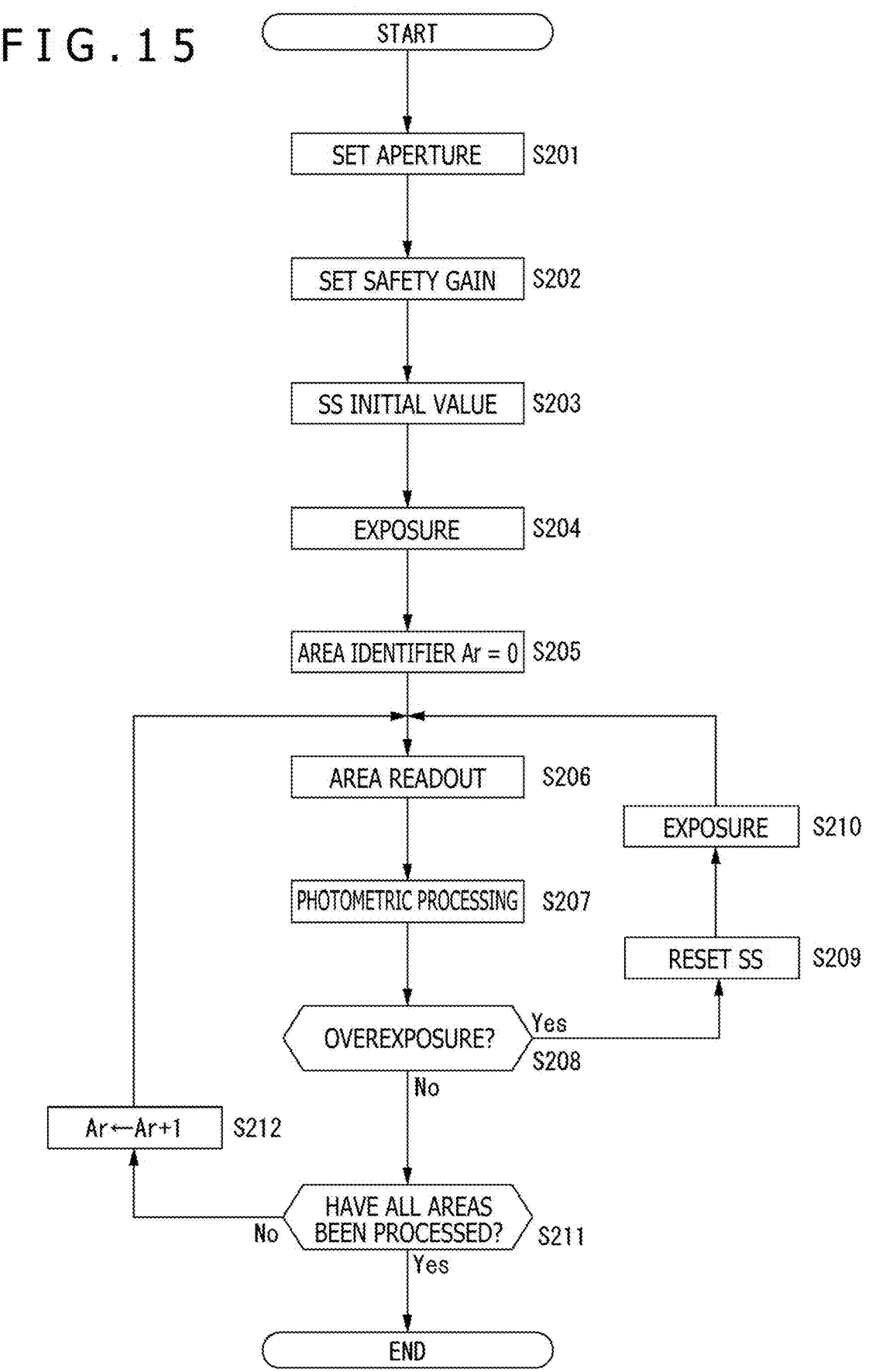
FIG. 15 is a flowchart illustrating a processing example of exposure control corresponding to an aperture priority mode in the embodiment.

Here, the control related to exposure can correspond to an aperture priority mode as illustrated in a flowchart in FIG. 15.

The technique illustrated in FIG. 15, which prioritizes the aperture, adjusts the shutter speed to provide the optimum exposure for each image formation area Ri.

Specifically, first, in step S201, the camera control section 46 controls, as aperture setting processing, the aperture mechanism 6 of each lens unit 3 to set the F-number to a specified value.

Then, in step S202 following step S201, the camera control section 46 executes, as safety gain setting processing, processing for setting the safety gain in the gain adjustment section 2a. The safety gain as used herein may be set to, for example, the minimum value. Alternatively, in a case where the setting range of the shutter speed is specified as a certain range, the safety gain may be set to a value low enough to prevent saturation on the basis of the setting range of the shutter speed and the F-number set in step S201.

In step S203 following step S202, the camera control section 46 sets an initial value for the shutter speed (SS). In the present example, as the initial value of the shutter speed, the lowest of the settable shutter speeds is set.

In step S204 following step S203, the camera control section 46 executes, as exposure processing, processing for causing the image sensor 2 to perform the exposure operation. The exposure operation is performed on the basis of the combination of the F-number set in step S201 and the shutter speed as the initial value set in step S203.

In step S205 following step S204, the camera control section 46 resets the area identifier Ar to 0, and in the subsequent step S206, causes the image sensor 2 to perform, as area readout processing, partial readout on the image formation area Ri indicated by the area identifier Ar.

Then, in step S207 following step S206, the camera control section 46 executes, as photometric processing, photometric processing for the captured image of the image formation area Ri indicated by the area identifier Ar, the captured image being obtained by the area readout operation in step S206.

In step S208 following step S207, the camera control section 46 determines whether or not the image is overexposed. In the case where the image is overexposed, the camera control section 46 proceeds to step S209 to execute shutter speed re-setting processing. The shutter speed re-setting processing includes executing processing for setting the shutter speed to a lower shutter speed.

Then, after executing the shutter speed re-setting processing in step S209, the camera control section 46 performs the exposure processing in step S210 to cause the image sensor 2 to perform the exposure operation, and returns to the area readout processing in step S206.

In a case where the procedure of the processing in steps S208, S209, S210, and S206 described above leads to overexposure at the tentatively set shutter speed, the shutter speed is re-set to a lower value (S209), exposure is performed again (S210), partial readout is performed on the image formation area Ri as a processing target (S206), and photometric processing is executed (S207). Then, whether or not the image is overexposed is determined again. The re-setting of the shutter speed is performed until the image is determined as not being overexposed in step S208.

In step S208, in the case of determining the image as not being overexposed, the camera control section 46 proceeds to step S211 to determine whether or not the processing is completed for all the areas. In the case of determining that the processing is not completed for all the areas, the camera control section 46 increments the area identifier Ar by one in step S212 and returns to step S206. Accordingly, the processing in step S206 and the subsequent steps is executed for the next image formation area Ri.

In response to determining that the processing is completed for all the areas in step S211, the camera control section 46 completes the series of processing operations illustrated in FIG. 15.

With the processing illustrated in FIG. 15, a captured image that has been subjected to the proper gain adjustment for each image formation area Ri can be obtained, with the F-number of the captured image of each image formation area Ri specified as a common value. Compared to the scheme in FIG. 14, the scheme in FIG. 15 optimally sets the exposure time. This is advantageous in terms of noise in measurement results.

7. Focusing

In general, the focal position of the lens varies with the wavelength of the lens.

Figure 16:
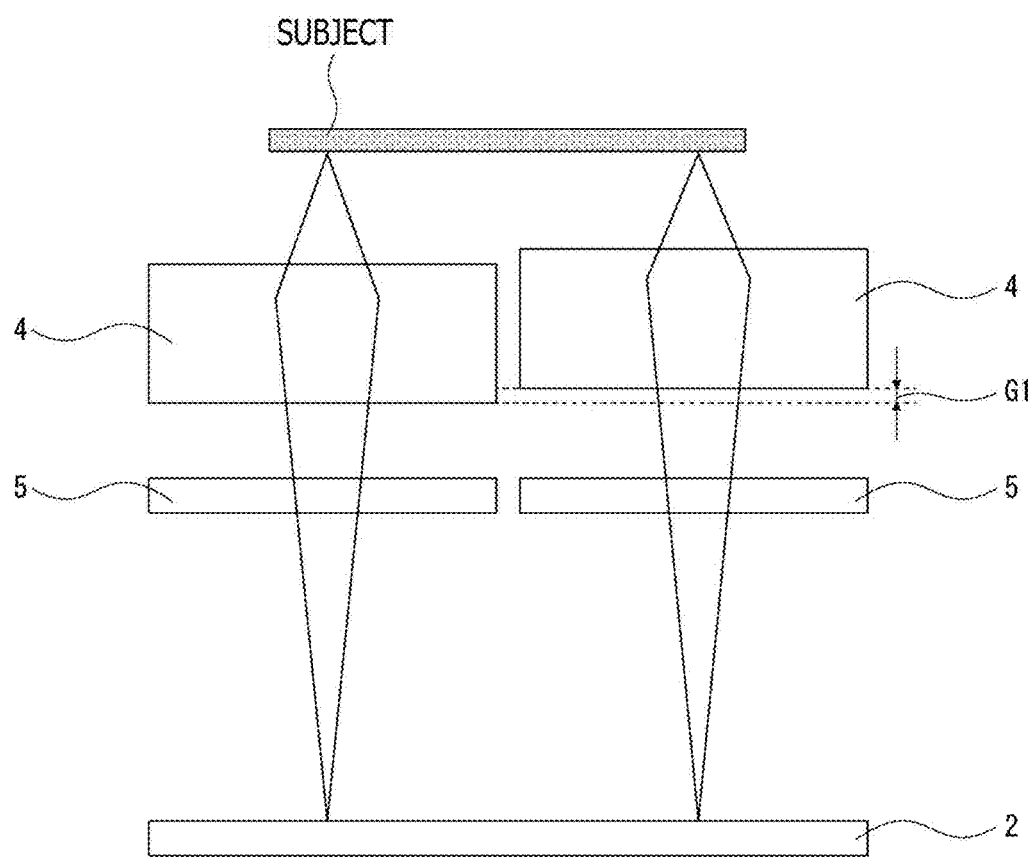
FIG. 16 is an explanatory diagram of an example of focus alignment for each lens section.

Accordingly, as depicted in a schematic diagram in FIG. 16, at least two lens sections 4 corresponding to different transmission wavelength bands of the wavelength filters 5 can be located at different positions in an optical axis direction.

By locating the two lens sections 4 at different positions in the optical axis direction, the focal position can be changed by a distance corresponding to a gap G1 depicted in the figure. Consequently, the setting of the gap G1 allows suppression of misalignment of the focal position between the lens sections 4 caused by a difference in wavelength.

Figure 17:
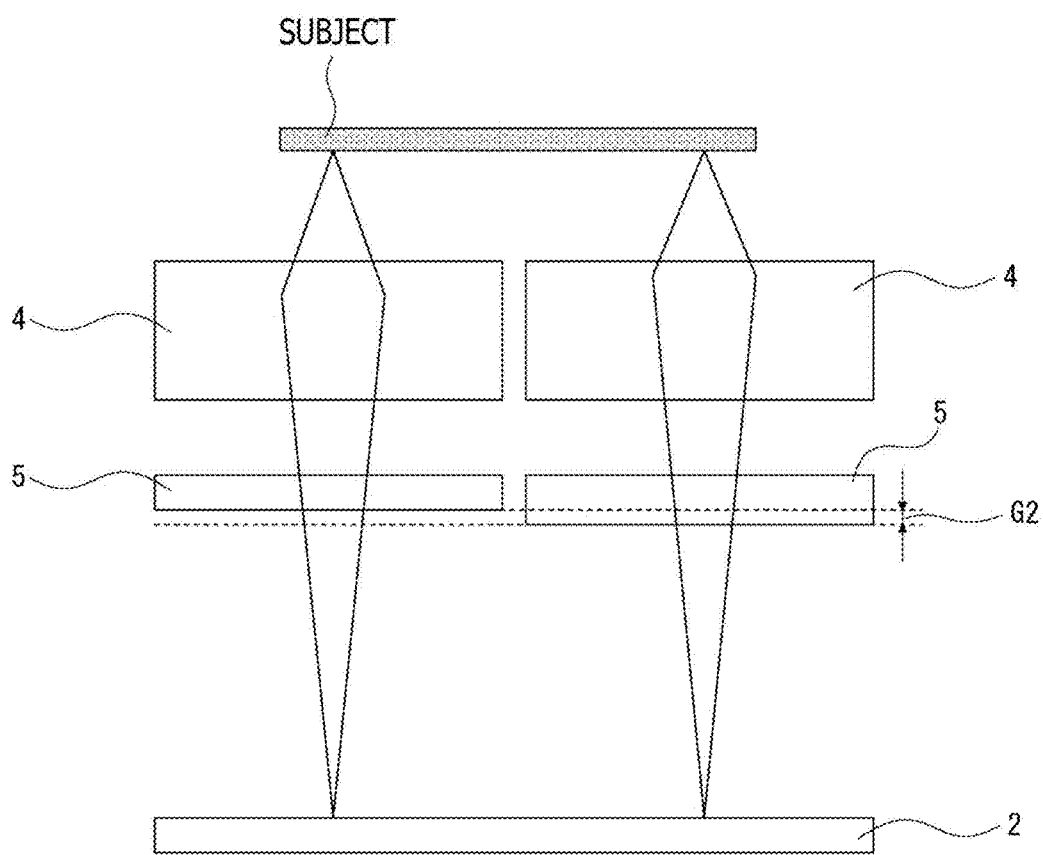
FIG. 17 is an explanatory diagram of another example of focus alignment for each lens section.

Alternatively, to suppress misalignment of the focal position caused by a difference in wavelength, a technique can be adopted in which the lens sections 4 corresponding to the different transmission wavelength bands of the wavelength filters 5 are made to correspond to different thicknesses of the wavelength filter 5 as depicted in a schematic diagram in FIG. 17.

Varying the thickness of the wavelength filter 5 allows the focal position to be varied by an amount corresponding to the difference in thickness between the wavelength filters 5, which is indicated by a gap G2 in the figure. Such a variation in focal position is caused by a difference in optical path length due to a difference in refractive index between a filter portion (for example, glass) and an air portion.

Consequently, the setting of the gap G2 allows suppression of misalignment of the focal position between the lens sections 4 caused by a difference in wavelength.

Note that, to suppress misalignment of the focal position, the technique described in FIG. 16 can be combined with the technique described in FIG. 17.

8. Wavelength Shift Measures

When light is obliquely incident on a bandpass filter used as the wavelength filter 5, the angle of the light varies a transmission characteristic of the light.

Figure 18:
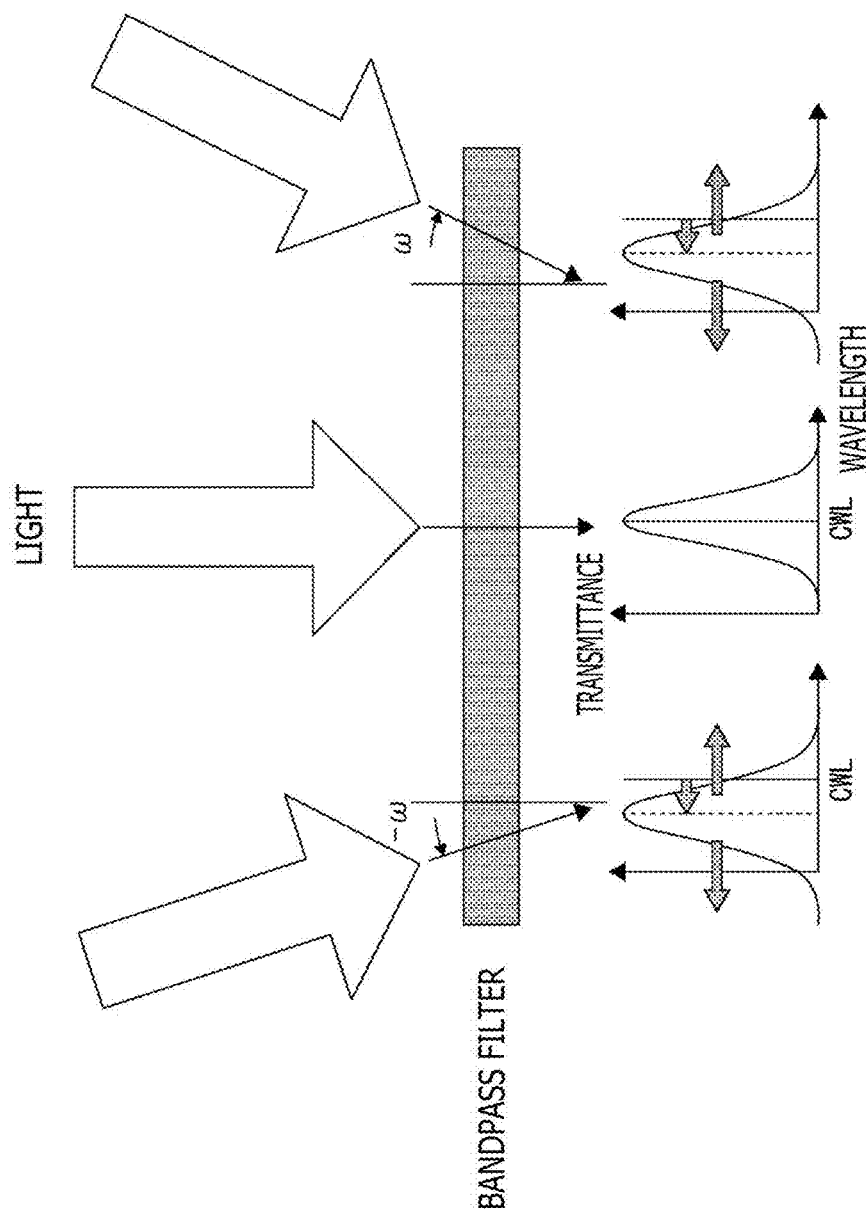
FIG. 18 is a diagram illustrating transmittance characteristics observed in a case where light is perpendicularly incident on a bandpass filter and in a case where light is obliquely incident on the bandpass filter.
Figure 19:
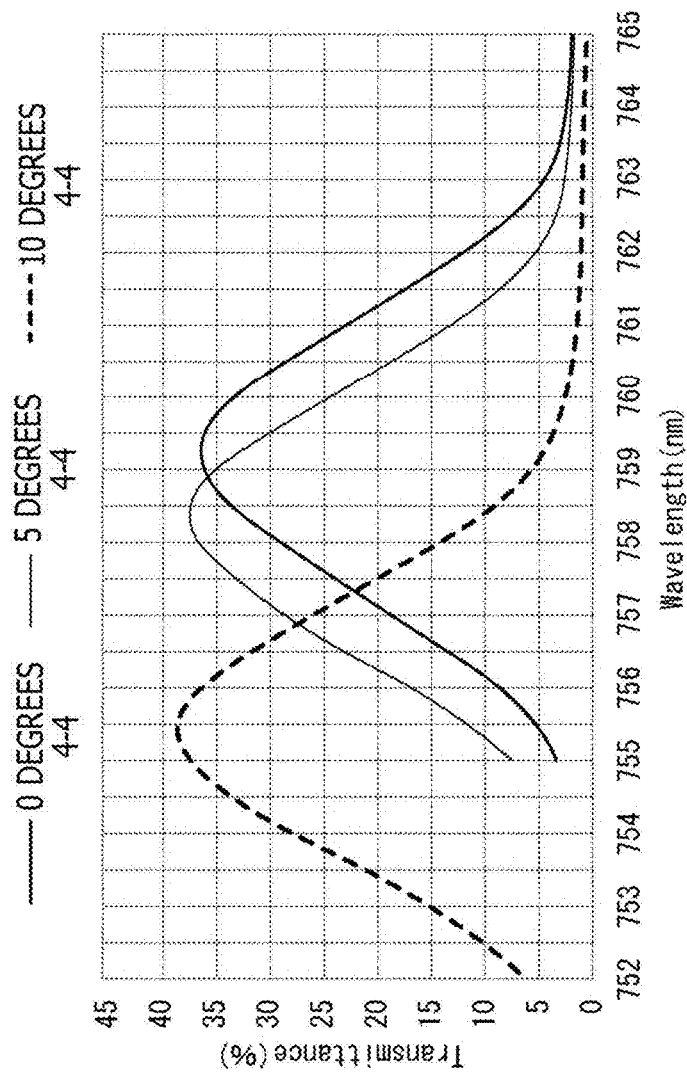
FIG. 19 is a diagram also illustrating transmittance characteristics observed in the case where light is perpendicularly incident on the bandpass filter and in the case where light is obliquely incident on the bandpass filter.

FIGS. 18 and 19 illustrate the transmittance characteristic (characteristic of variation of transmittance with respect to the wavelength) of light observed in a case where the light is perpendicularly incident on the bandpass filter (angle=0 degrees) and the transmittance characteristic of light observed in a case where the light is obliquely incident on the bandpass filter.

As seen in FIGS. 18 and 19, as the angle of the oblique incidence increases, the CWL shifts toward the shorter-wavelength side (toward the blue color side).

Figure 20:
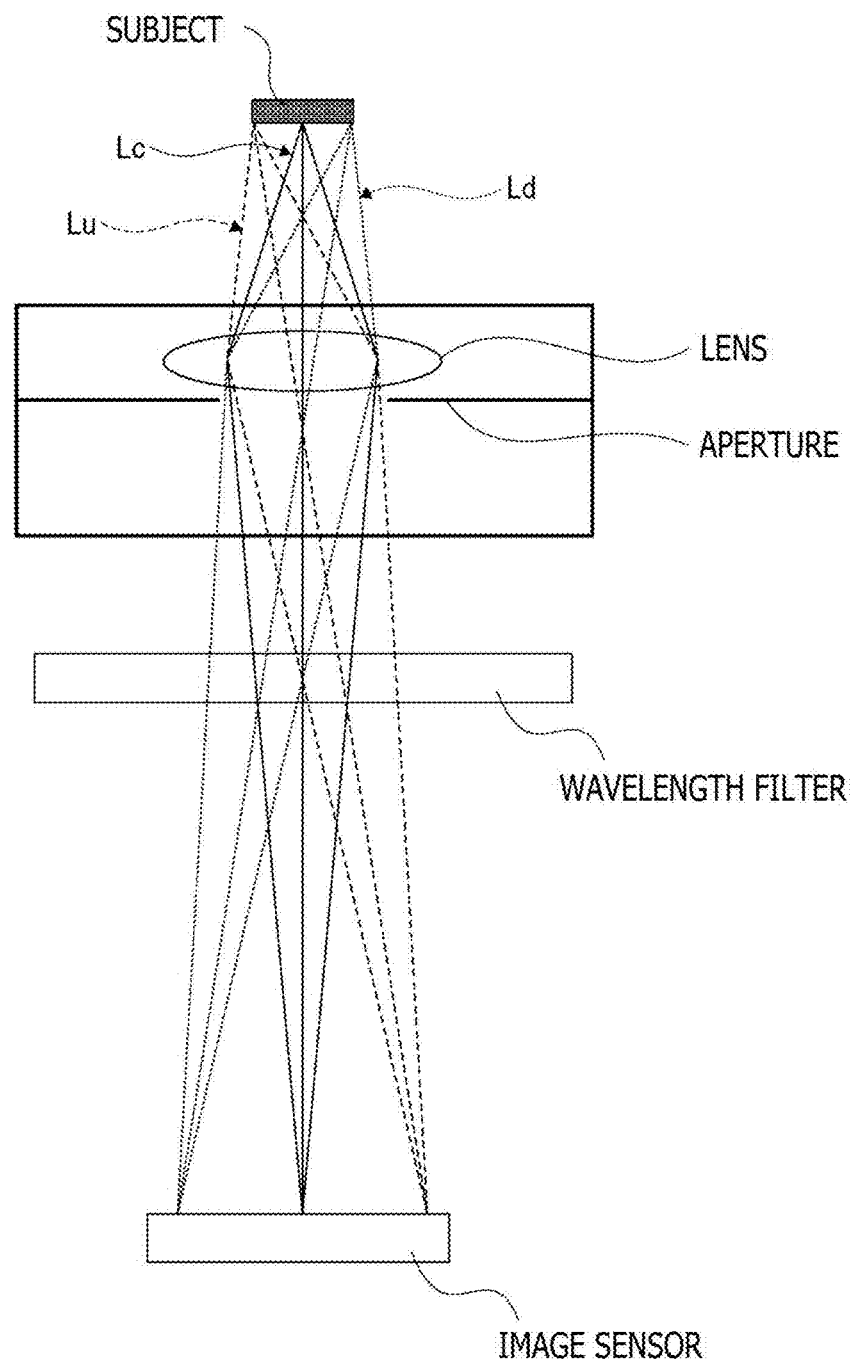
FIG. 20 is a diagram schematically depicting how luminous fluxes are emitted from respective positions of a subject and guided to an image sensor.

FIG. 20 schematically depicts how luminous fluxes are emitted from respective positions on the subject and guided to the image sensor 2. Note that FIG. 20 depicts, among luminous fluxes emitted from the respective positions on the subject, only a central luminous flux Lc emitted from a position on the optical axis and a lower-limit luminous flux Ld and an upper-limit luminous flux Lu respectively emitted from a lower-limit position and an upper-limit position located at both ends of the subject.

Of these luminous fluxes, the central luminous flux Lc has a chief ray parallel to the optical axis, and hence, is incident on the wavelength filter at an angle of 0 degrees (the incident angle as used herein is an inclination angle with respect to the optical axis), leading to no shift of the CWL. However, in the central luminous flux Lc, a lower ray and an upper ray are obliquely incident on the wavelength filter, thereby increasing the FWHM.

For the lower-limit luminous flux Ld and the upper-limit luminous flux Lu, the chief ray, the lower ray, and the upper ray are each obliquely incident on the wavelength filter, thereby shifting the CWL and increasing the FWHM.

Here, suppressing an increase in FWHM to suppress a shift in transmission wavelength is considered. To suppress an increase in FWHM, it is sufficient if the diameter of each luminous flux is reduced. A specific measure may include increasing the F-number (reducing the aperture diameter) or reducing the angle of view (making the lens more telephoto).

Further, to suppress a shift in transmission wavelength, a technique can be adopted that cuts luminous fluxes with a chief ray incident on the wavelength filter at a large angle (luminous fluxes causing a large shift in CWL), in other words, luminous fluxes emitted from high-image-light portions of the lower-limit luminous flux Ld and the upper-limit luminous flux Lu or the like (peripheral portions of an image circle are cut).

However, all of these techniques pose problems; the technique for specifically increasing the F-number darkens the image, the technique for reducing the angle of view makes it difficult to optimize the measurement range and the image resolution, and further the technique for excluding the luminous fluxes emitted from the high-image-light portions reduces a usage efficiency of a sensor surface of the image sensor 2.

Accordingly, in the present embodiment, the lens section 4 used includes an image-sided telecentric optical system or a two-sided telecentric optical system.

FIG. 21 is an explanatory diagram of telecentric optical systems. For comparison, FIG. 21A is a schematic diagram of a non-telecentric optical system, FIG. 21B is a schematic diagram of an image-sided telecentric optical system, and FIG. 21C is a schematic diagram of a two-sided telecentric optical system.

The telecentric optical system means an optical system having a chief ray parallel to the optical axis on an object side, on an image side, or both on the object side and on the image side.

As depicted in FIG. 21A, in the non-telecentric optical system, the chief ray is not parallel to the optical axis on the object side or on the image side.

The image-sided telecentric optical system is an optical system in which the chief ray is parallel to the optical axis only on the image side as depicted in FIG. 21B. The two-sided telecentric optical system is an optical system in which the chief ray is parallel to the optical axis both on the object side and on the image side as depicted in FIG. 21C.

Figure 22:
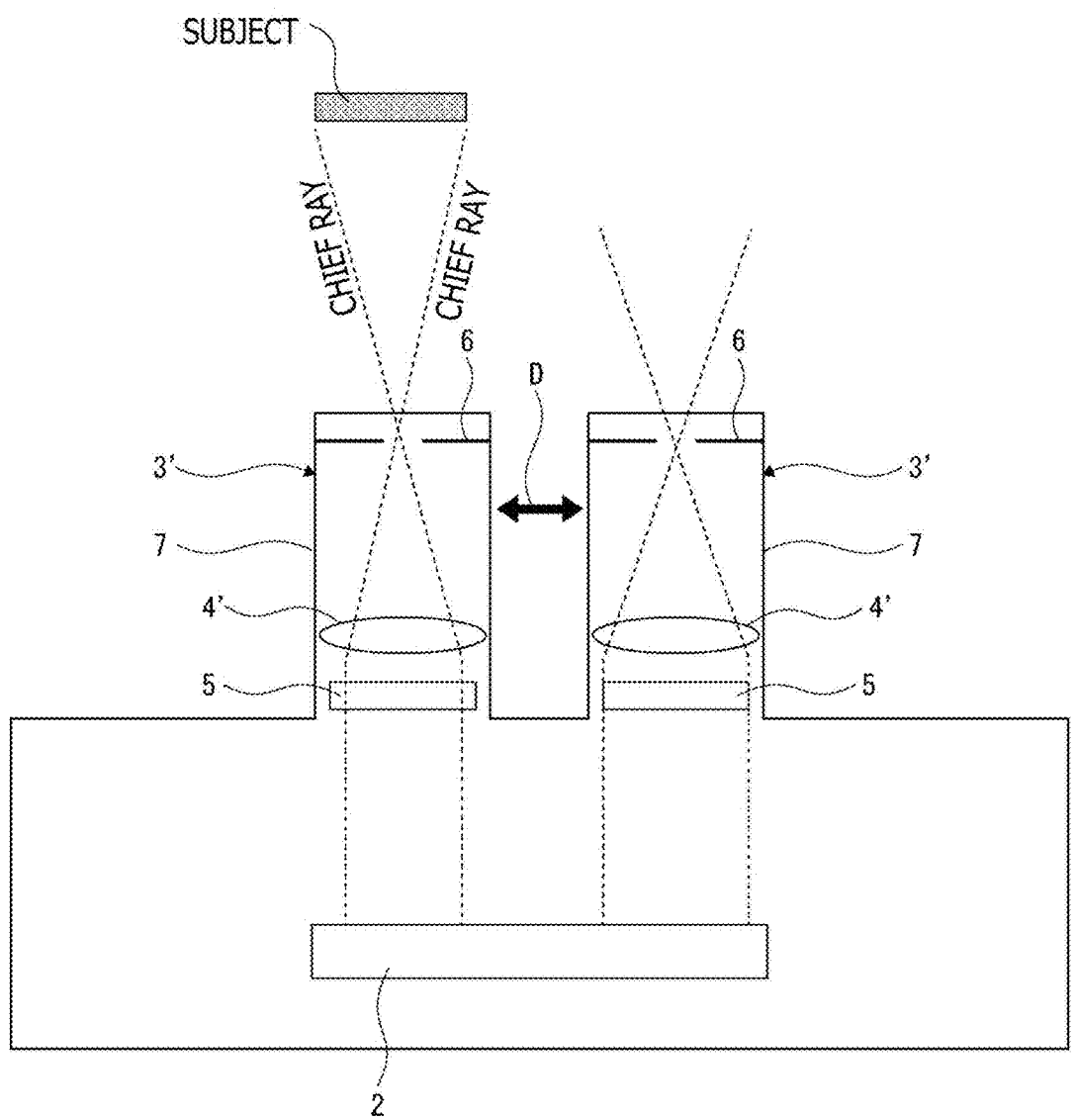
FIG. 22 is a schematic cross-sectional structure diagram of an imaging apparatus as an embodiment to which an image-sided telecentric optical system is applied.

FIG. 22 is a schematic cross-sectional structure diagram of an imaging apparatus 1' to which the image-sided telecentric optical system is applied. Note that, in the description below, portions similar to those already described are denoted by the same reference signs, and description of these portions is omitted.

In the imaging apparatus 1', each lens unit 3 is replaced with a lens unit 3' including an image-sided telecentric optical system. In each lens unit 3', the lens section 4 is replaced with a lens section 4' configured to satisfy conditions for the image-sided telecentric optical system described above.

In the configuration in which the image-sided telecentric optical system is applied to each lens unit 3' as described above, the angle at which the chief ray is incident on the wavelength filter 5 can be set to 0 degrees for the luminous fluxes including not only the central luminous flux Lc described above but also the lower-limit luminous flux Ld and the upper-limit luminous flux Lu.

This allows suppression of the CWL shift in the wavelength filter 5, and allows measurement accuracy to be increased.

Additionally, suppression of the wavelength shift does not require adoption of a technique such as an increase in F-number, a reduction in angle of view, or cutting of luminous fluxes emitted from high-image-light portions. This allows problems resulting from the adoption of these techniques to be avoided.

Note that, in the example described above, the image-sided telecentric optical system is applied, but that the two-sided telecentric optical system can be applied, and even in that case, effects similar to those described above can be obtained.

Here, in the case where the image-sided or two-sided telecentric optical system is applied, the image height of the lens has the same size as that of the image circle formed on the image sensor 2. Accordingly, for example, in a case where a design clearance is required between the lens barrels 7, excessively large intervals may be provided between the image formation areas Ri.

Figure 23:
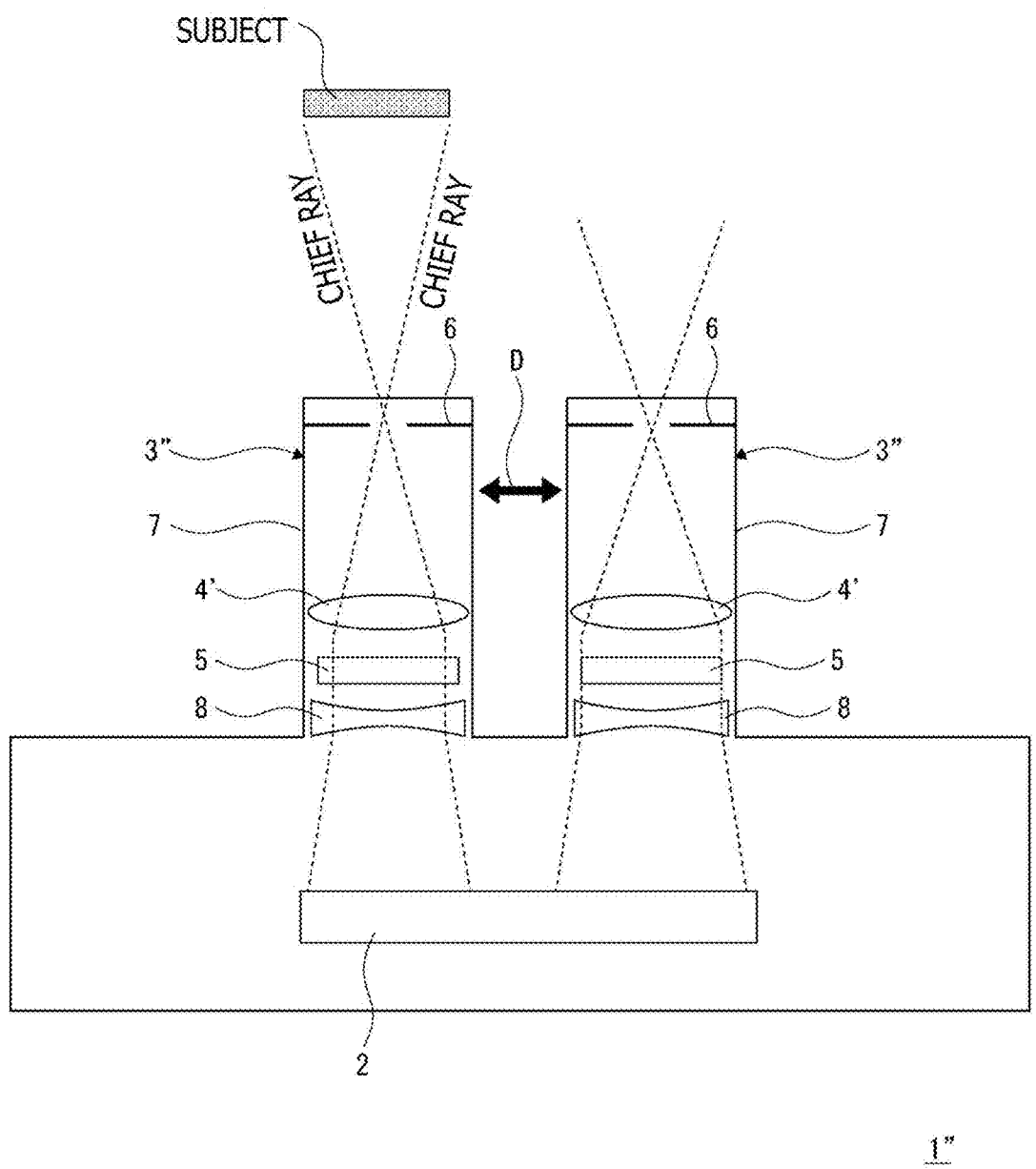
FIG. 23 is a schematic cross-sectional structure diagram of an imaging apparatus as an embodiment to which an image forming lens is applied.

Accordingly, a configuration can be adopted in which an image forming lens 8 is disposed between the image-sided or two-sided telecentric optical system and the image sensor 2 as in an imaging apparatus 1' depicted in a schematic cross-sectional structure diagram in FIG. 23. The image forming lens 8 as used herein means a lens that receives parallel luminous fluxes to form a subject image at a predetermined position.

Specifically, in the example illustrated in FIG. 23, the lens unit including the image forming lens 8 is denoted as the lens unit 3'. However, as depicted in the figure, in each lens unit 3', the image forming lens 8 is located at a position in the lens barrel 7 between the wavelength filter 5 and the image sensor 2.

The use of the image forming lens 8 enables adjustment of the position and size of the image formation area Ri provided on the image sensor 2 by the lens section 4' in the case where the image-sided or two-sided telecentric optical system is used.

This allows efficient arrangement of the image formation areas Ri on the sensor surface of the image sensor 2, such as prevention of excessive intervals from being provided between the image formation areas Ri on the sensor surface.

In particular, in a case where a clearance between the lens barrels 7 is required as depicted by an interval D in the figure, large intervals can be prevented from being provided between the image formation areas Ri, by using the image forming lens 8 to convert parallel rays from the telecentric optical system into divergent rays.

9. Lens Apparatus

In the above description, a prerequisite for the configuration is an imaging apparatus integrated with a lens. However, the present technology is suitably applicable to an imaging apparatus 1A with an interchangeable lens.

Figure 24:
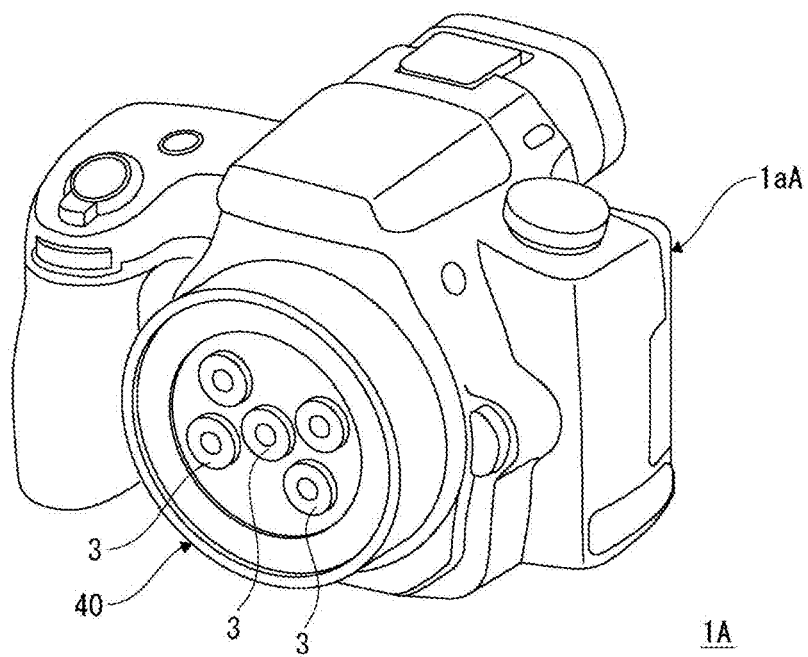
FIG. 24 is a perspective view depicting an appearance configuration example of an imaging apparatus with an interchangeable lens.
Figure 25:
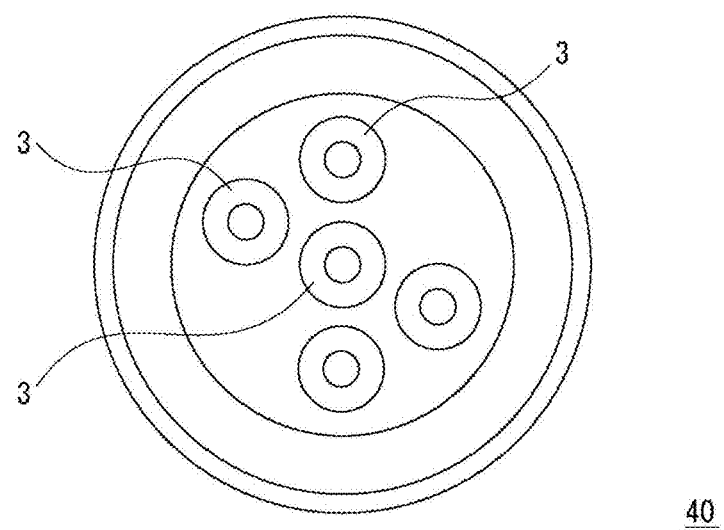
FIG. 25 is a plan view depicting an appearance configuration example of a lens apparatus as an embodiment.

FIG. 24 is a perspective view depicting an appearance configuration example of the imaging apparatus 1A. FIG. 25 is a plan view (plan view as seen from the front side) depicting an appearance configuration example of a lens apparatus 40 that can be attached to and detached from a main body section 1aA of the imaging apparatus 1A.

As depicted in the figure, the lens apparatus 40 is provided with multiple lens units 3. In the imaging apparatus 1A, with the lens apparatus 40 attached to the main body section 1aA, each lens unit 3 forms a subject image in a different area of a single image sensor 2 formed on the main body section 1aA.

Figure 26:
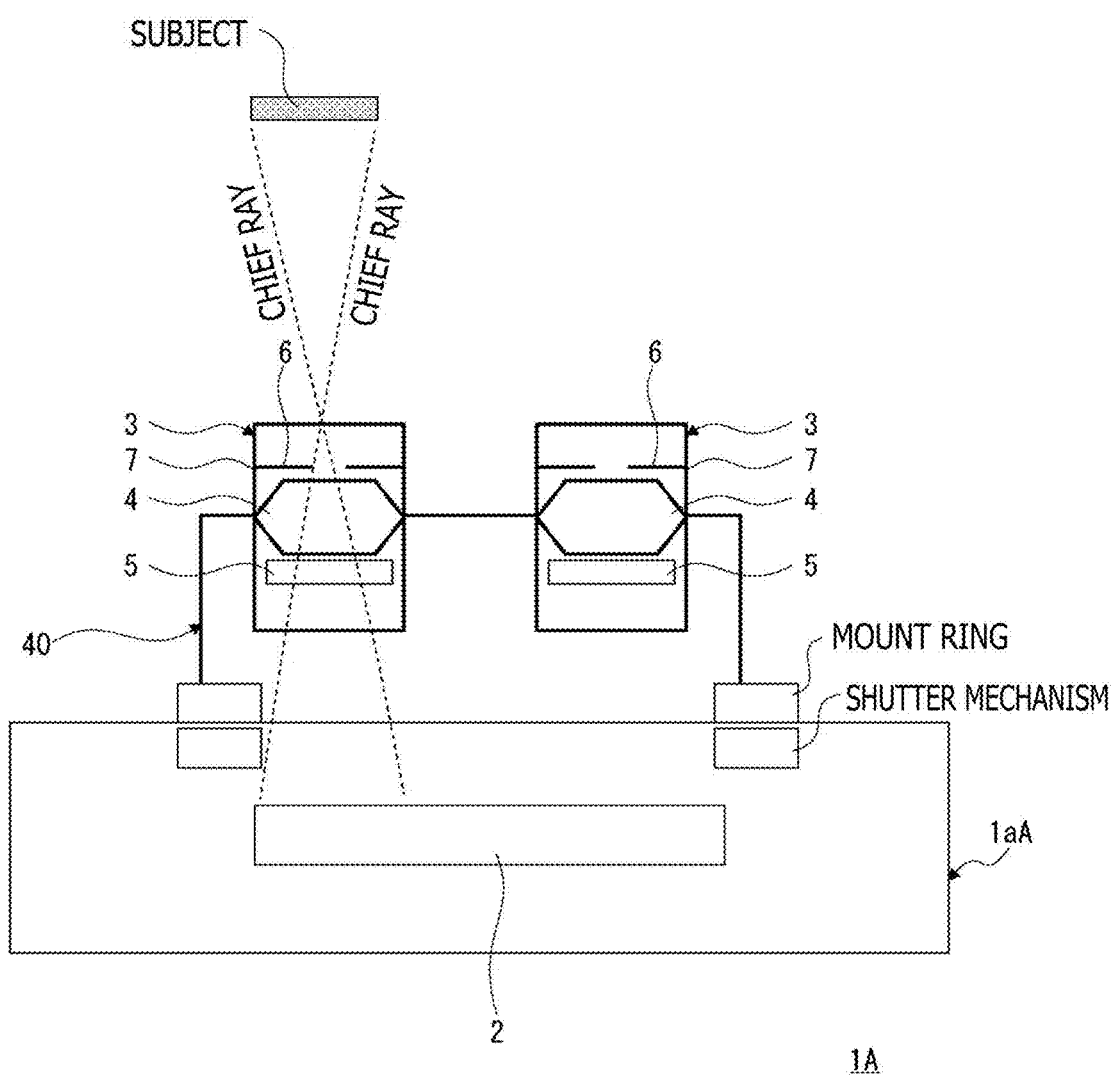
FIG. 26 is a diagram depicting a schematic cross-sectional structure of the imaging apparatus with the lens apparatus as the embodiment attached thereto.

FIG. 26 illustrates a schematic cross-sectional structure of the imaging apparatus 1A with the lens apparatus 40 attached thereto.

FIG. 26 illustrates a schematic formation position of a mount ring provided with a mounting mechanism for mounting the lens apparatus 40 to the main body section 1aA and a schematic formation position of a shutter mechanism formed in the main body section 1aA.

Here, the wavelength filter 5 can be formed on an optical low pass filter 9.

Figure 27:
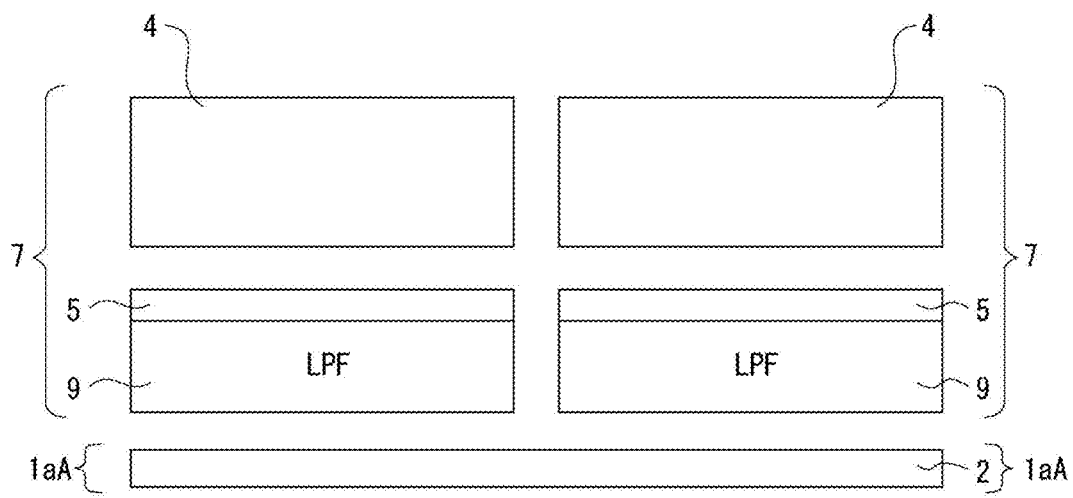
FIG. 27 is an explanatory diagram of an example in which a wavelength filter is formed on an optical low pass filter located in a lens barrel.

FIG. 27 illustrates an example in which the optical low pass filter 9 is disposed in the lens barrel 7 of each lens section 4 and in which each optical low pass filter 9 is provided with the wavelength filter 5 in the form of a film for each lens section 4.

Figure 28:
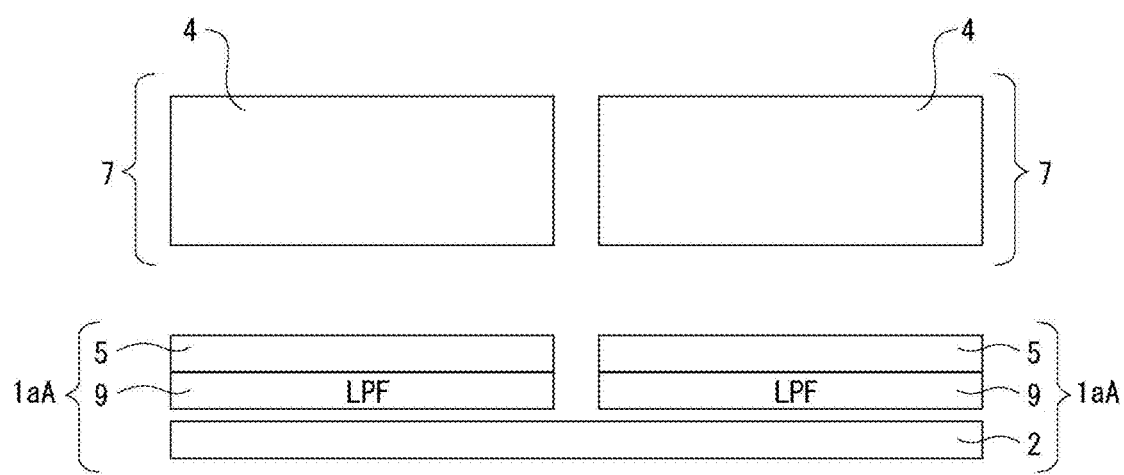
FIG. 28 is an explanatory diagram of an example in which a wavelength filter is formed on an optical low pass filter located in a main body section.

Additionally, FIG. 28 illustrates an example in which the optical low pass filter 9 formed for each lens section 4 in the main body section 1aA is provided with the wavelength filter 5 in the form of a film for each lens section 4. In this case, the wavelength filter 5 can be formed on the optical low pass filter 9 formed on the image sensor 2.

Note that, as described above, also in the case where a configuration integrated with a lens is adopted, the wavelength filter 5 can be provided on the main body section 1a side. In that case, too, for example, the wavelength filter 5 can be formed on the optical low pass filter 9 formed on the image sensor 2.

Additionally, also in the case where a configuration with an interchangeable lens is adopted, the image-sided or two-sided telecentric optical system described above can be applied.

Figure 29:
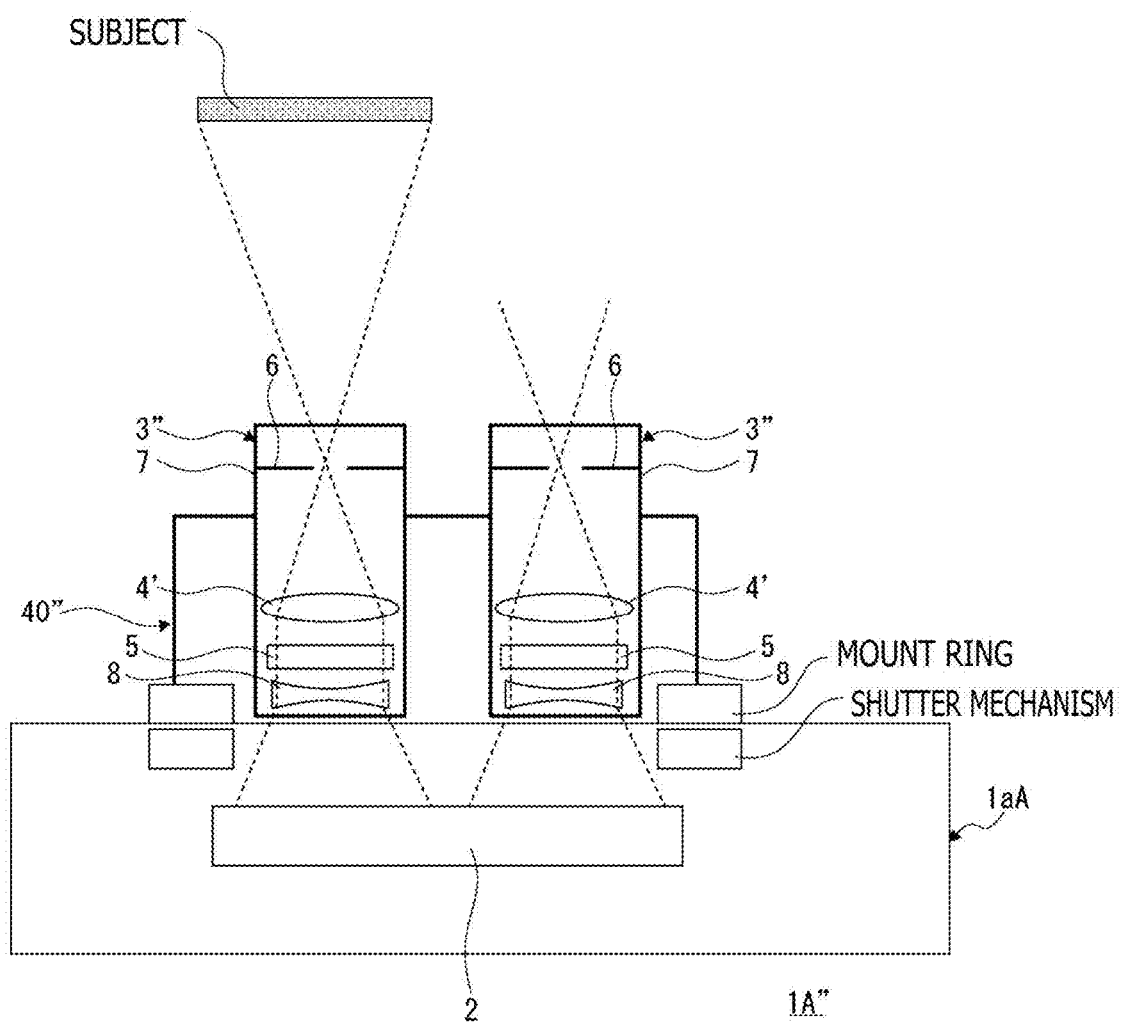
FIG. 29 is a schematic cross-sectional structure diagram of a lens apparatus and an imaging apparatus as an embodiment to which an image-sided telecentric optical system and an image forming lens are applied.

FIG. 29 depicts, as an example, a schematic cross-sectional structure diagram of a lens apparatus 40' for which the image-sided telecentric optical system is adopted and which includes the lens unit 3' provided with the image forming lens 8, the diagram also depicting an imaging apparatus 1A'.

Here, in the case where the image-sided or two-sided telecentric optical system is adopted, given an attempt is made to increase the size of the image formation area Ri on the image sensor 2 with no image forming lens 8 provided, the diameter of an outgoing luminous flux from the lens section 4' may be increased by, for example, increasing the lens diameter of the lens section 4'.

However, if the outgoing luminous flux from the telecentric optical system has an increased diameter as in the case of the configuration with an interchangeable lens, the mount ring blocks a portion of the luminous flux, leading to vignetting. Additionally, regardless of whether or not the configuration includes an interchangeable lens, in a configuration with a shutter mechanism, the shutter mechanism similarly blocks a portion of the luminous flux, leading to vignetting.

Compared to a case in which an outgoing luminous flux with a large diameter is directly formed into an image, a configuration in which the image forming lens 8 converts the outgoing luminous flux from the telecentric optical system into divergent rays can reduce the possibility that the mount ring or the shutter mechanism blocks a portion of the luminous flux, allowing vignetting to be suppressed.

10. Conclusion of Embodiment

As described above, the imaging apparatus (imaging apparatus 1, 1', 1', 1A, 1A') in the embodiment as described above includes the image sensor (image sensor 2) and the multiple lens sections (lens sections 4, 4') each configured to form a subject image in a different area of the image sensor via the different wavelength filter (wavelength filter 5), and at least one of the multiple lens sections has an angle of view different from that of the other lens sections.

As described above, the configuration includes the multiple lens sections each configured to form a subject image in a different area of the image sensor via the different wavelength filter, thereby eliminating the need to provide multiple image sensors to obtain a spectral image for each wavelength. Additionally, at least one of the multiple lens sections has an angle of view different from that of the other lens sections, and hence, different angles of view can be set according to the wavelength.

Consequently, a technology can be provided that can reduce the size and weight of a multi-spectrum camera that obtains a spectral image for each wavelength, the technology also enabling the multi-spectrum camera to capture an image at an appropriate angle of view corresponding to the wavelength.

Additionally, in the imaging apparatus in the embodiment, the lens sections include a first lens section configured to perform image formation via a wavelength filter that transmits R, G, and B light for each pixel of the image sensor and a second lens section configured to perform image formation via a wavelength filter that transmits light of a predetermined wavelength band for entire irradiation light traveling to an image formation area of the second lens section on the image sensor, and the first lens section has a wider angle of view than the second lens section (for example, see the difference between the image formation area Ri5 and the other image formation areas Ri in FIG. 8).

The RGB image obtained by the first lens section is suitable for checking the appearance over a wide range and is desired to be a wide-angle image. In contrast, an image entirely including a light receiving signal of light of a predetermined wavelength band, such as an NIR image, suitably has a high resolution for various measurements and is desired to be a narrow-angle image.

Consequently, according to the above-described configuration, the angle of view can appropriately be set according to the characteristics of each image obtained by the first and second lens sections.

Further, in the imaging apparatus in the embodiment, as the lens sections, the lens sections having a relation in which the wavelength filters use the same transmission wavelength band but the angle of view varies among the lens sections are provided (see FIG. 10).

This enables different measurements to be performed on images of the same wavelength by utilizing the difference in angle of view.

Further, in the imaging apparatus in the embodiment, at least one of the multiple lens sections corresponds to an image formation area size different from that for the other lens sections, on the image sensor (see FIG. 9).

Not only the angle of view but also a resolution or an aspect ratio required may vary for each lens section, and the image formation area on the image sensor for each lens section needs to be located in a geometrically appropriate fashion according to the shape of the image sensor.

With the configuration in which at least one of the lens sections corresponds to an image formation area size different from that for the other lens sections as described above, the resolution and the aspect ratio of the image formation area appropriate for each lens section can be set, and the image formation areas for the respective lens sections can appropriately be located according to the shape of the image sensor.

Additionally, in the imaging apparatus in the embodiment, the wide-angle lens section of the multiple lens sections that has a wider angle of view than the other lens sections corresponds to a larger image formation area size than the other lens sections (see FIG. 9).

This enables the number of pixels in a wide-angle image to be made larger than the number of pixels in a narrow-angle image.

Consequently, a decrease in the resolution of the wide-angle image can be suppressed.

Further, in the imaging apparatus in the embodiment, the lens sections for which the wavelength filters use different transmission wavelength bands are located at different positions in the optical axis direction (see FIG. 16).

Changing the position of the lens section in the optical axis direction changes a focal position.

Consequently, according to the above-described configuration, misalignment of the focal position between the lens sections caused by a difference in wavelength can be suppressed.

Further, in the imaging apparatus in the embodiment, the lens sections for which the wavelength filters use different transmission wavelength bands correspond to different thicknesses of the wavelength filter (see FIG. 17).

Varying the thickness of the wavelength filter varies the focal position of the lens section.

Consequently, according to the above-described configuration, misalignment of the focal position between the lens sections caused by a difference in wavelength can be suppressed.

Additionally, in the imaging apparatus in the embodiment, the wavelength filter is disposed in the main body section (main body section 1a, 1aA) rather than in a lens barrel section (lens barrel 7) housing the lens section (see FIGS. 27 and 28).

This can eliminate the need to secure an arrangement space for the wavelength filter in the lens barrel section.

Consequently, the lens barrel section can be miniaturized.

Further, in the imaging apparatus in the embodiment, the wavelength filter is formed on the optical low pass filter formed on the image sensor (see FIGS. 27 and 28).

Thus, the wavelength filter is formed integrally with the optical low pass filter.

Consequently, in a case where the wavelength filter is provided on the main body section side, the space required to dispose the wavelength filter can be reduced, allowing the main body section to be miniaturized.

Further, in the imaging apparatus in the embodiment, the image sensor is configured to enable partial readout and includes a gain adjustment section (gain adjustment section 2a) capable of adjusting a gain individually for each partially readout signal.

This enables the gain to be appropriately adjusted for each wavelength.

Consequently, appropriate measurement can be performed for each wavelength.

Further, the imaging apparatus in the embodiment includes a control section (camera control section 46) configured to cause the image sensor to execute an exposure operation using a combination of an F-number and a shutter speed determined on the basis of a photometric result, and configured to control the gain adjustment section to cause the gain provided to the readout signal to vary between the image formation areas on the image sensor for at least two lens sections.

Accordingly, a single exposure operation enables appropriate gain adjustment according to each wavelength.

Further, in the imaging apparatus (imaging apparatus 1', 1', 1A') in the embodiment, the lens section (lens section 4') includes an image-sided telecentric optical system or a two-sided telecentric optical system (see FIGS. 22, 23, and 29).

This makes at least a chief ray on an image side parallel to the optical axis, enabling each chief ray to be prevented from obliquely entering the wavelength filter via the lens section.

Consequently, a shift in transmission wavelength that is caused by oblique incidence on the wavelength filter can be suppressed.

Further, in the imaging apparatus in the embodiment, an image forming lens (image forming lens 8) is provided between the image-sided telecentric optical system or the two-sided telecentric optical system and the image sensor (see FIGS. 23 and 29).

The use of the image forming lens enables adjustment of the position and size of the image formation area provided on the image sensor by the lens section in the case where the image-sided or two-sided telecentric optical system is used.

This enables efficient arrangement of the image formation areas on the sensor surface, such as prevention of excessive intervals from being provided between the image formation areas on the sensor surface.

For example, a clearance may be required between lens barrels, and in that case, large intervals are provided between the image formation areas. By using the image forming lens to convert parallel rays from the telecentric optical system into divergent rays, large intervals can be prevented from being provided between the image formation areas even in the case where a clearance is required as described above.

Additionally, to make the image formation area size as large as possible, the diameter of an outgoing luminous flux from the telecentric optical system may be increased by, for example, increasing the lens diameter of the lens section. However, if the diameter of the outgoing luminous flux from the telecentric optical system is increased in the case of a configuration with an interchangeable lens, the mount ring may block a portion of the luminous flux to cause vignetting. Additionally, regardless of whether or not the configuration includes an interchangeable lens, in a configuration with a shutter mechanism, the shutter mechanism may similarly block a portion of the luminous flux, leading to vignetting.

Additionally, a lens apparatus (lens apparatus 40, 40') in the embodiment includes multiple lens sections (lens sections 4, 4') each configured to form a subject image in a different area of one image sensor via a different wavelength filter, and at least one of the multiple lens sections has an angle of view different from that of the other lens sections.

As described above, the lens apparatus includes the multiple lens sections each configured to form a subject image in a different area of the image sensor via the different wavelength filter, eliminating the need to provide multiple image sensors in order to obtain a spectral image for each wavelength. Additionally, at least one of the multiple lens sections has an angle of view different from that of the other lens sections, and hence, different angles of view can be set according to the wavelength.

Consequently, a technology can be provided that can reduce the size and weight of a multi-spectrum camera that obtains a spectral image for each wavelength, the technology also enabling the multi-spectrum camera to capture an image at an appropriate angle of view corresponding to the wavelength.

The effects described herein are only illustrative and not restrictive, and any other effects may be produced.

11. Present Technology

Note that the present technology can also adopt the following configurations:

(1)
An imaging apparatus including:
an image sensor; and
multiple lens sections each configured to form a subject image in a different area of the image sensor via a different wavelength filter, in which
at least one of the multiple lens sections has an angle of view different from an angle of view of the other lens sections.

(2)
The imaging apparatus according (1) above, in which
the lens sections include a first lens section configured to perform image formation via a wavelength filter that separately transmits R, G, and B light for each pixel of the image sensor and a second lens section configured to perform image formation via a wavelength filter that transmits light of a predetermined wavelength band for entire irradiation light traveling to an image formation area of the second lens section on the image sensor, and
the first lens section has a wider angle of view than the second lens section.

(3)
The imaging apparatus according to (1) or (2) above, in which
the lens sections include lens sections having a relation in which the wavelength filters use a same transmission wavelength band but the angle of view varies among the lens sections.

(4)
The imaging apparatus according to any one of (1) to (3) above, in which
at least one of the multiple lens sections corresponds to an image formation area size different from an image formation area size for the other lens sections, on the image sensor.

(5)
The imaging apparatus according to (4) above, in which
a wide-angle lens section of the multiple lens sections that has a wider angle of view than the other lens sections corresponds to a larger image formation area size than the other lens sections.

(6)
The imaging apparatus according to any one of (1) to (5) above, in which
the lens sections for which the wavelength filters use different transmission wavelength bands are located at different positions in an optical axis direction.

(7)
The imaging apparatus according to any one of (1) to (6) above, in which
the lens sections for which the wavelength filters use different transmission wavelength bands correspond to different thicknesses of the wavelength filter.

(8)
The imaging apparatus according to any one of (1) to (7) above, in which
the wavelength filter is disposed in a main body section rather than in a lens barrel section housing the lens section.

(9)
The imaging apparatus according to (8) above, in which
the wavelength filter is formed on an optical low pass filter formed on the image sensor.

(10)
The imaging apparatus according to any one of (1) to (9) above, in which
the image sensor is configured to enable partial readout and includes a gain adjustment section capable of adjusting a gain individually for each partially readout signal.

(11)
The imaging apparatus according to (10) above, including:
a control section configured to cause the image sensor to execute an exposure operation using a combination of an F-number and a shutter speed determined on the basis of a photometric result, and configured to control the gain adjustment section to cause the gain provided to the readout signal to vary between image formation areas on the image sensor for at least two of the lens sections.

(12)
The imaging apparatus according to any one of (1) to (11) above, in which
the lens section includes an image-sided telecentric optical system or a two-sided telecentric optical system.

(13)
The imaging apparatus according to (12) above, in which
an image forming lens is provided between the image-sided telecentric optical system or the two-sided telecentric optical system and the image sensor.

(14)
A lens apparatus including:
multiple lens sections each configured to form a subject image in a different area of one image sensor via a different wavelength filter, in which
at least one of the multiple lens sections has an angle of view different from an angle of view of the other lens sections.

REFERENCE SIGNS LIST 1, 1', 1', 1A, 1A': Imaging apparatus
10: Information processing apparatus
200: Flying body
300: Farm field
A-HR, A-LR: Range
LR: Low-resolution image
HR: High-resolution image
1, #2, #3, #4, #5: Zone
1a, 1aA: Main body section
2: Image sensor
3, 3', 3': Lens unit
4, 4': Lens section
5: Wavelength filter
6: Aperture mechanism
7: Lens barrel
Ri: Image formation area
2a: Gain adjustment section
41: Camera signal processing section
42: Recording control section
43: Display section
44: Communication section
45: Operation section
46: Camera control section
47: Memory section
48: Driver section
49: Sensor section
Lc: Central luminous flux
Ld: Lower-limit luminous flux
Lu: Upper-limit luminous flux
8: Image forming lens
40, 40': Lens apparatus
9: Optical low pass filter

The invention claimed is:

1. An imaging apparatus comprising:
an image sensor; and
a plurality of lens sections, each lens section being configured to form a subject image in a different area of the image sensor via a different wavelength filter,
wherein at least one lens section of the plurality of lens sections has an angle of view different from an angle of view of other lens sections of the plurality of lens sections,
wherein the subject image formed by the at least one lens section having the different angle of view has a lower resolution than the subject image formed by each other lens section of the plurality of lens sections,
wherein a merged image is generated using the subject image formed by each lens section of the plurality of lens sections, and
wherein the merged image expresses, for each zone imaged with the lower resolution by the at least one lens section having the different angle of view, a representative value of a measurement result obtained by imaging each zone with higher resolution by one or more of the other lens sections of the plurality of lens sections.

2. The imaging apparatus according to claim 1, wherein the plurality of lens sections include a first lens section configured to perform image formation via a wavelength filter that separately transmits red, green, and blue light for each pixel of the image sensor and a second lens section configured to perform image formation via a wavelength filter that transmits light of a predetermined wavelength band for entire irradiation light traveling to an image formation area of the second lens section on the image sensor, and
the first lens section has a wider angle of view than the second lens section.

3. The imaging apparatus according to claim 1,
wherein the plurality of lens sections include lens sections having a relation in which the wavelength filters use a same transmission wavelength band but the angle of view varies among the plurality of lens sections.

4. The imaging apparatus according to claim 1,
wherein the at least one lens section of the plurality of lens sections corresponds to an image formation area size different from an image formation area size for the other lens sections, on the image sensor.

5. The imaging apparatus according to claim 4,
wherein a wide-angle lens section of the plurality of lens sections that has a wider angle of view than the other lens sections corresponds to a larger image formation area size than the other lens sections.

6. The imaging apparatus according to claim 1,
wherein the plurality of lens sections for which the wavelength filters use different transmission wavelength bands are located at different positions in an optical axis direction.

7. The imaging apparatus according to claim 1,
wherein the plurality of lens sections for which the wavelength filters use different transmission wavelength bands correspond to different thicknesses of the wavelength filter.

8. The imaging apparatus according to claim 1, wherein the wavelength filter is disposed in a main body section, and
the plurality of lens sections are housed in a lens barrel section separate from the main body section.

9. The imaging apparatus according to claim 8,
wherein the wavelength filter is formed on an optical low pass filter formed on the image sensor.

10. The imaging apparatus according to claim 1,
wherein the image sensor is configured to enable partial readout and includes a gain adjustment section configured to adjust a gain individually for each partially readout signal.

11. The imaging apparatus according to claim 10, further comprising:
circuitry configured to
cause the image sensor to execute an exposure operation using a combination of an F-number and a shutter speed determined on a basis of a photometric result, and
cause the gain provided to the readout signal to vary between image formation areas on the image sensor for at least two lens sections of the plurality of lens sections.

12. The imaging apparatus according to claim 1,
wherein each lens section includes at least one of an image-sided telecentric optical system or a two-sided telecentric optical system.

13. The imaging apparatus according to claim 12,
wherein an image forming lens is provided between the image-sided telecentric optical system and the image sensor.

14. The imaging apparatus according to claim 12,
wherein an image forming lens is provided between the two-sided telecentric optical system and the image sensor.

15. A lens apparatus comprising:
a plurality of lens sections each configured to form a subject image in a different area of one image sensor via a different wavelength filter,
wherein at least one lens section of the plurality of lens sections has an angle of view different from an angle of view of other lens sections of the plurality of lens sections,
wherein the subject image formed by the at least one section having the different angle of view has a lower resolution than the subject image formed by each other lens section of the plurality of lens sections,
wherein a merged image is generated using the subject image formed by each lens section of the plurality of lens sections, and
wherein the merged image expresses, for each zone imaged with the lower resolution by the at least one lens section having the different angle of view, a representative value of a measurement result obtained by imaging each zone with higher resolution by one or more of the other lens sections of the plurality of lens sections.

* * * * *